(12) United States Patent
Shibata et al.

(10) Patent No.: US 8,606,079 B2
(45) Date of Patent: Dec. 10, 2013

(54) RECORDING APPARATUS, RECORDING METHOD, REPRODUCTION APPARATUS, REPRODUCTION METHOD, RECORDING AND REPRODUCTION APPARATUS, RECORDING AND REPRODUCTION METHOD, IMAGE CAPTURING AND RECORDING APPARATUS, AND IMAGE CAPTURING AND RECORDING METHOD

(75) Inventors: Yoshiaki Shibata, Kanagawa (JP);
Minoru Kawahara, Kanagawa (JP);
Yuuichi Motomura, Tokyo (JP)

(73) Assignee: Sony Corporation (JP)

( * ) Notice: Subject to any disclaimer, the term of this patent is extended or adjusted under 35 U.S.C. 154(b) by 914 days.

(21) Appl. No.: 11/880,793

(22) Filed: Jul. 24, 2007

(65) Prior Publication Data
US 2009/0226149 A1    Sep. 10, 2009

(30) Foreign Application Priority Data

Jul. 31, 2006    (JP) .............................. P2006-208677

(51) Int. Cl.
H04N 9/80    (2006.01)
H04N 5/92    (2006.01)
G11B 27/00   (2006.01)
H04N 5/93    (2006.01)

(52) U.S. Cl.
USPC ........... 386/248; 386/239; 386/278; 386/281; 386/326

(58) Field of Classification Search
USPC ................. 386/200–234, 239–248, 278–290, 386/326–342
See application file for complete search history.

(56) References Cited

U.S. PATENT DOCUMENTS

| | | | |
|---|---|---|---|
| 4,980,818 A | | 12/1990 | Shinmura |
| 5,260,801 A | * | 11/1993 | Temma et al. ................ 386/230 |
| 5,829,046 A | * | 10/1998 | Tzelnic et al. ................ 711/162 |
| 6,898,160 B2 | * | 5/2005 | Sawabe et al. ............. 369/30.09 |
| 7,206,973 B2 | * | 4/2007 | Daftardar ........................ 714/43 |
| 7,236,684 B2 | | 6/2007 | Kawakami et al. |
| 7,383,446 B1 | | 6/2008 | Hatanaka et al. |
| 7,869,697 B2 | | 1/2011 | Nagaoka et al. |

(Continued)

FOREIGN PATENT DOCUMENTS

| | | |
|---|---|---|
| EP | 0 978 994 | 2/2000 |
| EP | 1632947 | 3/2006 |

(Continued)

OTHER PUBLICATIONS

Computer-generated translation of JP 2000-182358.*

(Continued)

*Primary Examiner* — Hung Dang
(74) *Attorney, Agent, or Firm* — Lerner, David, Littenberg, Krumholz & Mentlik, LLP

(57) ABSTRACT

A recording apparatus is provided. The recording apparatus divides a material including video and/or audio information and records divided materials onto a plurality of recording media. The recording apparatus includes a control unit configured to divide the material into a plurality of divided materials and to prepare, for each of the divided materials, reproduction procedure information including recording information for the divided materials; an interface configured to attach the plurality of recording media; and a recording device configured to record the divided materials and the reproduction procedure information including recording information for the divided materials onto separate recording media for the respective divided materials.

16 Claims, 15 Drawing Sheets

(56) References Cited

U.S. PATENT DOCUMENTS

| | | |
|---|---|---|
| 2002/0018644 A1 | 2/2002 | Isobe et al. |
| 2002/0073110 A1 | 6/2002 | Duvillier et al. |
| 2002/0146075 A1* | 10/2002 | Kauffman et al. ....... 375/240.28 |
| 2003/0028553 A1 | 2/2003 | Kondo |
| 2003/0142954 A1* | 7/2003 | Kotani et al. ................. 386/52 |
| 2003/0210898 A1 | 11/2003 | Juen et al. |
| 2004/0056087 A1 | 3/2004 | Bonneau et al. |
| 2004/0163123 A1* | 8/2004 | Okada et al. ................. 725/116 |
| 2004/0172575 A1 | 9/2004 | Lo et al. |
| 2004/0184775 A1 | 9/2004 | Nakamura et al. |
| 2005/0114438 A1 | 5/2005 | Bendich et al. |
| 2005/0114483 A1 | 5/2005 | Kocho |
| 2005/0120167 A1* | 6/2005 | Oiwa et al. ................... 711/112 |
| 2005/0122863 A1* | 6/2005 | Kudo ........................ 369/47.23 |
| 2005/0149579 A1 | 7/2005 | Tsubaki et al. |
| 2005/0237865 A1 | 10/2005 | Ando et al. |
| 2005/0286377 A1 | 12/2005 | Fontijn |
| 2006/0013085 A1 | 1/2006 | Kelly et al. |
| 2006/0051056 A1 | 3/2006 | Furukawa et al. |
| 2006/0056800 A1* | 3/2006 | Shimagami et al. ............ 386/52 |
| 2006/0112124 A1 | 5/2006 | Ando et al. |
| 2006/0115240 A1* | 6/2006 | Takahashi et al. ............ 386/111 |
| 2006/0126451 A1 | 6/2006 | Shinkai et al. |
| 2006/0195486 A1 | 8/2006 | Ohno et al. |
| 2006/0265426 A1 | 11/2006 | Chen |
| 2007/0143328 A1 | 6/2007 | Green et al. |
| 2007/0255727 A1 | 11/2007 | Hirose et al. |
| 2008/0063387 A1 | 3/2008 | Yahata et al. |
| 2008/0131098 A1* | 6/2008 | Nishitani et al. .............. 386/126 |

FOREIGN PATENT DOCUMENTS

| | | | |
|---|---|---|---|
| EP | 1653466 | 5/2006 | |
| JP | 11-341434 A | 12/1999 | |
| JP | 2000-021086 A | 1/2000 | |
| JP | 2000-182358 * | 6/2000 | ............ G11B 27/00 |
| JP | 2003-052040 A | 2/2003 | |
| JP | 2003-061041 A | 2/2003 | |
| JP | 2003217266 | 7/2003 | |
| JP | 2004-127426 A | 4/2004 | |
| JP | 2004-328034 A | 11/2004 | |
| JP | 2004-328073 A | 11/2004 | |
| JP | 2005-004850 A | 1/2005 | |
| JP | 2005-005915 A | 1/2005 | |
| JP | 2005-236950 A | 9/2005 | |
| JP | 2005-309503 A | 11/2005 | |
| JP | 2005-309504 A | 11/2005 | |
| JP | 2006-107580 A | 4/2006 | |
| JP | 2006-127560 A | 5/2006 | |
| WO | 00/28544 | 5/2000 | |
| WO | 2004042724 | 5/2004 | |
| WO | 2006/033279 A1 | 3/2006 | |
| WO | 2006030767 A1 | 3/2006 | |

OTHER PUBLICATIONS

U.S. Appl. No. 11/904,286.

U.S. Appl. No. 11/906,064.

U.S. Appl. No. 11/897,546.

"Synchronized Multimedia Integration Language (SMIL) 1.0 Specification" Internet Citation, Jun. 15, 1998, http://www.w3.org/tr/rec-smil>.

Office Action from Japanese Application No. 2006-269891, dated Jun. 21, 2011.

Office Action from Korean Application No. 10-2007-0073831, dated Aug. 28, 2013.

* cited by examiner

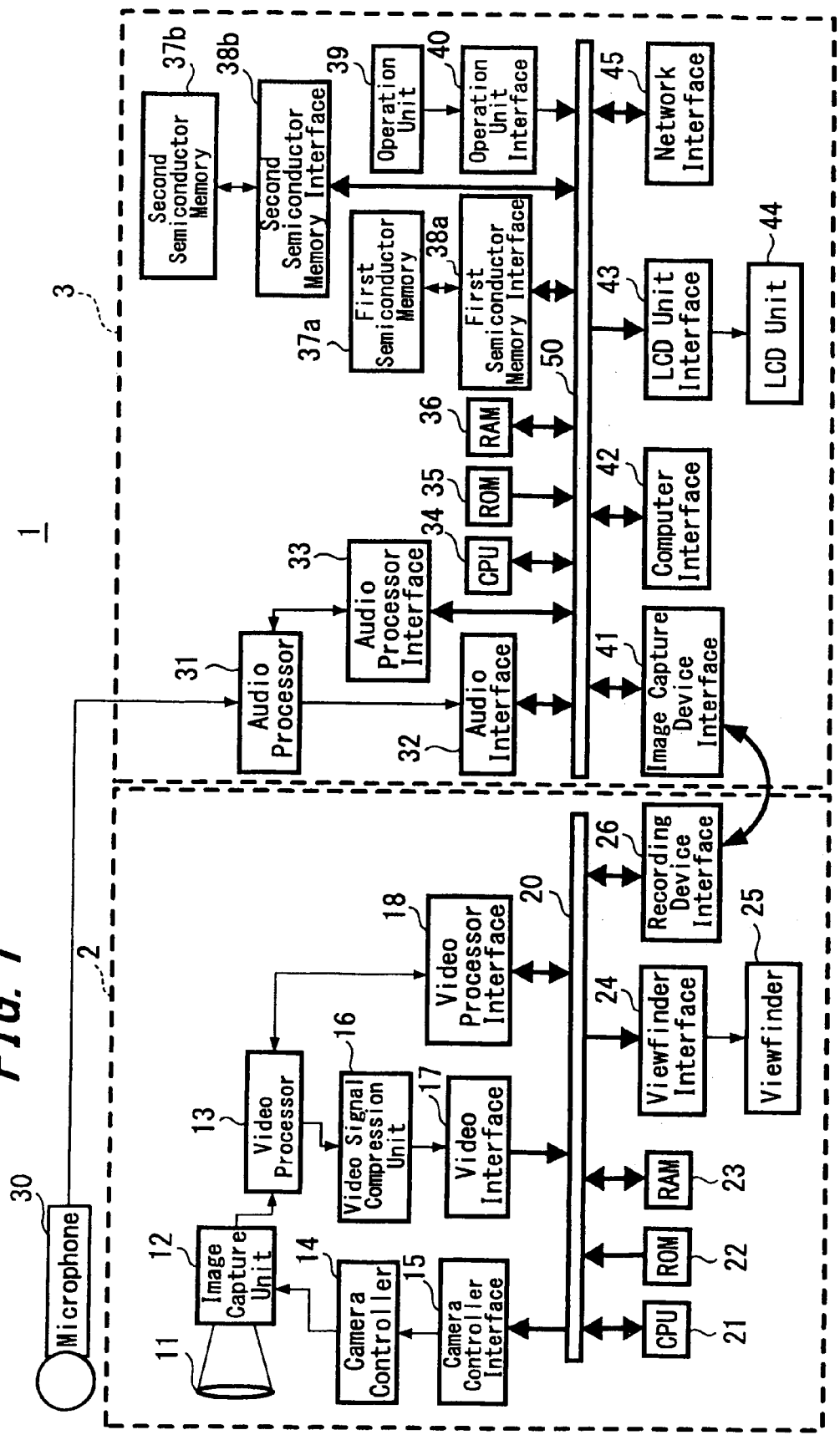

FIG. 2

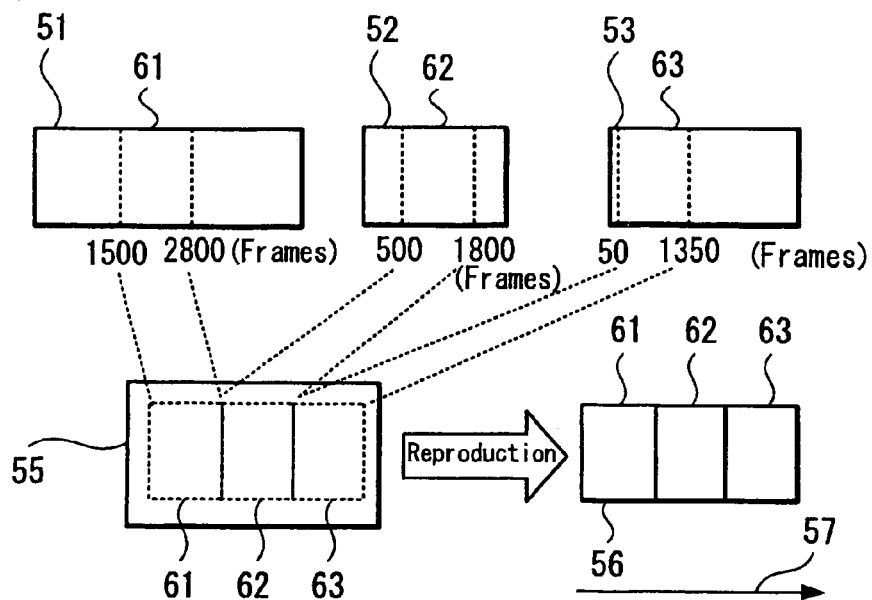

FIG. 3

```
<smil name ="EditList 1">
    <body>
        <video src="Clip 1" clipBegin=" 1500" clipEnd=" 2800 "/>
        <video src="Clip 2" clipBegin=" 500" clipEnd=" 1800 "/>
        <video src="Clip 3" clipBegin=" 50" clipEnd=" 1350 "/>
    </body>
</smil>
```

FIG. 4

```
<smil name ="EditList 1">
    <body>
        <par>
            <video src="Clip 1" clipBegin=" 1500 " clipEnd=" 2800 "/>
            <video src="Clip 2" clipBegin=" 500 " clipEnd=" 1800 " begin=" 1300 "/>
            <video src="Clip 3" clipBegin=" 50 " clipEnd=" 1350 " begin=" 2600 "/>
        </par>
    </body>
</smil>
```

```
<smil name ="EditList 2">
   <body>
      <par>
         <video src="Clip 1" clipBegin=" 1500 " clipEnd=" 2800 "/>
         <video src="Clip 2" clipBegin=" 500 " clipEnd=" 1800 " begin=" 1300 "/>
      </par>
   </body>
</smil>
```

FIG. 7

```
<smil name =" EditList 3">
    <body>
        <par>
            <video src =" Clip 3" clipBegin =" 50 " clipEnd =" 1350 "/>
        </par>
    </body>
</smil>
```

FIG. 8

```
<smil name =" EditList 4">
    <body>
        <video src =" EditList 2 "/>
        <video src =" EditList 3 "/>
    </body>
</smil>
```

```
<smil name ="EditList 3">
  <body>
    <par>
      <video src="Clip 3" clipBegin="50" clipEnd="1350" alt=" In Memory Card #3 "/>
    </par>
  </body>
</smil>
```

FIG. 12

```
<smil name =" EditList -i">
  <body>
    <video src =" Clip-1"/>
      .
      .
    <video src =" Clip-i"/>
    <video src =" EditList - (i+1)" clipBegin =" Dur(Clip -1) + ... + Dur(Clip-i)"/>
  </body>
</smil>
```

FIG. 13A

ABCD1001E01.SMI

```
..
<body>
<par>
<video src="ABCD1001Q01.MP4"
       begin="00:00:00:00"
       clipBegin="00:00:00:00"
       clipEnd="00:29:59:29" />
<video src="ABCD1001E02.SMI"
       begin="00:30:00:00"
       clipBegin="00:30:00:00" />
</par>
</body>
..
```

FIG. 13B

ABCD1001E02.SMI

```
..
<body>
<par>
<video src="ABCD1001Q01.MP4"
       begin="00:00:00:00"
       clipBegin="00:00:00:00"
       clipEnd="00:29:59:29" />
<video src="ABCD1002Q01.MP4"
       begin="00:30:00:00"
       clipBegin="00:30:00:00"
       clipEnd="00:59:59:29" />
<video src="ABCD1001E03.SMI"
       begin="01:00:00:00"
       clipBegin="01:00:00:00" />
</par>
</body>
..
```

FIG. 13C

ABCD1001E03.SMI

```
..
<body>
<par>
<video src="ABCD1001Q01.MP4"
       begin="00:00:00:00"
       clipBegin="00:00:00:00"
       clipEnd="00:29:59:29" />
<video src="ABCD1002Q01.MP4"
       begin="00:30:00:00"
       clipBegin="00:30:00:00"
       clipEnd="00:59:59:29" />
<video src="ABCD1003Q01.MP4"
       begin="01:00:00:00"
       clipBegin="01:00:00:00"
       clipEnd="01:09:59:29" />
</par>
</body>
..
```

FIG. 14

```
<smil name ="EditList-n">
    <body>
        <video src="Clip-1"/>
              :
        <video src="Clip-i"/>
              :
        <video src="Clip-n"/>
    </body>
</smil>
```

ABCD1001E09.SMI

```
:
<body>
<par>
    <video src=" ABCD1001Q01.MP4"
        begin=" 00:00:00:00"
        clipBegin=" 00:00:00:00"
        clipEnd=" 00:29:59:29"
    <video src=" ABCD1002Q01.MP4"
        begin=" 00:30:00:00"
        clipBegin=" 00:30:00:00"
        clipEnd=" 00:59:59:29"
    <video src=" ABCD1003Q01.MP4"
        begin=" 01:00:00:00"
        clipBegin=" 01:00:00:00"
        clipEnd=" 01:09:59:29"
</par>
</body>
:
```

FIG. 16

```
<smil name = "EditList-1">
  <body>
    <video src="Clip-1"/>
    <video src="EditList-2" clipBegin =" Dur (Clip-1)"/>
  </body>
</smil>
```

FIG. 17

```
<smil name = "EditList - i">
  <body>
    <video src=" EditList -(i-1)" clipEnd =" Dur (Clip - 1) + ... + Dur (Clip - (i-1))"/>
    <video src =" Clip - i"/>
    <video src=" EditList - (i+1)" clipBegin =" Dur (Clip-1) + ... + Dur (Clip - i)"/>
  </body>
</smil>
```

FIG. 18

```
<smil name =" EditList -n ">
  <body>
    <video src=" EditList- (n-1)" clipEnd =" Dur (Clip - 1) + ... + Dur (Clip - (n-1))"/>
    <video src =" Clip-n "/>
  </body>
</smil>
```

FIG. 19

```
<Metadata targetClip ="EditList-n ">
    <Title> My long AV clip </Title>
    <Description> Worldcup Football Game </Description>
</Metadata>
```

FIG. 20

```
<smil name ="EditList-i">
<body>
    <video src ="EditList-(i-1)" clipBegin ="Dur(Clip-1) + ... + Dur(Clip-(i-1))"/>
    <video src ="Clip-i" clipBegin ="3" clipEnd ="121"/>
    <video src ="EditList-(i+1)" clipBegin ="Dur(Clip-1) + ... + Dur(Clip-i)"/>
</body>
</smil>
```

RECORDING APPARATUS, RECORDING METHOD, REPRODUCTION APPARATUS, REPRODUCTION METHOD, RECORDING AND REPRODUCTION APPARATUS, RECORDING AND REPRODUCTION METHOD, IMAGE CAPTURING AND RECORDING APPARATUS, AND IMAGE CAPTURING AND RECORDING METHOD

CROSS-REFERENCES TO RELATED APPLICATIONS

The present invention contains subject matter related to Japanese Patent Application JP 2006-208677, filed in the Japanese Patent Office on Jul. 31, 2006, the entire contents of which are incorporated herein by reference.

BACKGROUND OF THE INVENTION

1. Field of the Invention

This invention relates to a recording apparatus, recording method, reproduction apparatus, reproduction method, recording and reproduction apparatus, recording and reproduction method, image capturing and recording apparatus, and image capturing and recording method, suitable for application when recording data across a plurality of recording media and for reproducing recorded data.

2. Description of the Related Art

In the past, image capturing and recording apparatuses have included apparatuses which have recorded to semiconductor memory, in a predetermined format, video data (moving images) and audio data (sound) captured by a digital video camera or other image capture apparatus. In the case of compressing and recording video data captured using an image capture apparatus, two methods, which are an intra-codec method and an inter-codec method, have been used. The intra-codec method is a method of performing compression of one captured frame at a time as still images. On the other hand, the inter-codec method is a method of extracting and separating the image on which one frame is based (the I picture) and difference information from the base image over a plurality of frames (P pictures, B pictures) before compression. Here, the collection of frames of the I picture, P pictures, and B pictures is called a GOP (Group Of Pictures). Video data compressed using either method is recorded as a file.

In recent years on the Internet, SMIL (Synchronized Multimedia Integration Language) has come to be used as a language for use in rearranging video, audio, text, graphics, and other multimedia materials, in space and in time, to prepare new content. In the following explanation, both video and audio, or either one, may be called "AV" (audio-visual) materials. Further, reproduction procedure information which lists places for reproduction of a plurality of AV materials is called an "EditList". An EditList may also be called a playlist or non-destructive editing description data. Further, a unit of AV data of arbitrary length is called a "clip" (material). A "clip" may also mean AV material configured as a single file. An interval of predetermined length can be extracted from a clip to prepare another clip, or a clip can be divided for use as a divided clip (or divided material).

In recent years, information relating to video, audio, and other content has been handled as metadata, and standardization has been promoted for international unification of metadata among broadcasting stations. In order to standardize the format for metadata, specifications for different metadata items have been proposed. Metadata items include, for example, the UMID (Unique Material Identifier) formulated by the SMPTE (Society of Motion Picture and Television Engineers). A UMID provides unique IDs for identifying each piece of content, and is a 32-byte data item enabling GPS (Global Positioning System) information, date and time, country name, region, company name, and other information to be added, if necessary.

Japanese Unexamined Patent Application Publication No. 2005-309503 (JP 2005-309503 A) discloses technology in which, in the case of dividing timewise-continuous data for recording onto a plurality of recording media (optical discs), history information including identifiers for mounted recording media is caused to be contained in multiplexed information and written back to the recording media, so that the recording media preceding the recording media can easily be identified.

Japanese Unexamined Patent Application Publication, No. 2005-309504 (JP 2005-309504 A) discloses technology in which, the recording media in the technology disclosed in JP 2005-309503 A is data.

Japanese Unexamined Patent Application Publication No. 2004-328073 (JP 2004-328073 A) discloses technology in which, in the case of dividing timewise-continuous video data and writing the divided video data to two recording media, the two are associated. Specifically, there are 1) technology for associating filenames (for example, suffixes) (for example, DSCF0001A.AVI and DSCF0001B.AVI, and similar); 2) technology for writing mutual reference file names to user areas within Exif files or AVI files; and 3) technology for providing, on the respective recording media, information files indicating the relation therebetween.

Japanese Unexamined Patent Application Publication No. 2004-328034 (JP 2005-328034 A) discloses technology in which, even in the case where timewise-continuous video data is divided into divided data and recorded with different filenames in a plurality of recording media, the video data can be reproduced as a single data entity, by appending and recording video file relation information on a video data file positioned after a timewise earlier video data file. Specifically, link information, containing the filename and similar of the following video file, is recorded as an independent text data file together with the first-half video data file.

Japanese Unexamined Patent Application Publication No. H11-341434 (JP H11-341434 A) discloses technology in which, in order to facilitate handling during editing or to enhance the non-destructive properties of data, continuous video data is divided based on a predetermined time period or data amount, and is recorded as files. However, as technology for associating divided files, "previous file" information and "next file" information should be provided in the header portion of each divided file.

SUMMARY OF THE INVENTION

As explained above, there have been a number of reports of technologies in which a long-duration clip is divided into and recorded as a plurality of divided files, and a certain divided file is described in association with the previous and next divided files. However, information which can be utilized in these technologies is limited merely to local information between divided files, and does not represent information for the original long-duration clip in its entirety. That is, merely by referencing a divided file, it may not easily be checked from what position on the time axis in the original long-duration clip the divided file has been extracted. Further, in the case where a certain divided file contains invalid frames, it has not been easy to specify the invalid interval to be excluded. This is because in the past, in descriptions of associations of divided files, no methods have been provided for excluding the influence of invalid frame intervals. Here, for example, in a case of GOP recording, when a P picture or B picture frame is the starting frame of a valid interval, an invalid frame is an I frame referenced thereby (which exists earlier in time) or similar and occurs when data is compressed using an inter-codec method which may require a GOP configuration. In such a case, if link relations for previous and subsequent divided files are merely described, then invalid frame intervals may overlap and be reproduced, and the quality of the displayed image may be seriously reduced. Specifically, files are recorded based on a GOP. Therefore, in the case where a clip is divided at a frame not positioned at the boundary between GOPs, the GOP including the frame is recorded into divided files respectively. Further, it has not been possible to easily assign a unique title or comment to an original long-duration clip. In other words, because it has been necessary to assign the relevant unique title or comment to each one of the divided files, operation efficiency has not been improved, and it has been difficult to handle files when, for example, different titles have been assigned to different divided files.

Further, the technologies disclosed in JP 2005-309503 A, JP 2005-309504 A, JP 2004-328073 A, JP 2005-328034 A, and JP H11-341434 A are all used merely to divide an original long-duration clip, and to describe the association between a certain divided file and the divided file immediately preceding (or in some cases immediately following). Here, in order to associate a divided file, if a user area is employed as is disclosed in JP 2004-328073 A, then despite the fact that a general-use file format has been adopted, it may be necessary to separately add particular processing for the user area. Further, if a dedicated header is provided as is disclosed in JP H11-341434 A, then the file format itself becomes a particular format, so that apparatus dependence is increased, and convenience of use decreases. Thus, technologies in related art to associate divided files may require the separate addition of dedicated processing, and implementation has been complicated.

Further, as the image quality of images captured by image capture apparatuses has improved, the image capture time which can be stored in semiconductor memory has been reduced to several tens of minutes. As a result, in order to capture images for a long period of time, a plurality of slots into which semiconductor memory devices can be inserted are prepared in an image capture apparatus, where the semiconductor memory devices may be required to be replaced frequently. In this case, even when semiconductor memory is replaced, data is read out immediately and then transferred to a large-capacity hard disk drive or similar, the metadata added to the transferred data is only information for each semiconductor memory device. Hence, it has been difficult to connect and reproduce data read out from a plurality of semiconductor memory devices. For example, filenames are assigned in the manner File1, File2, . . . . However, the filenames of divided files are not necessarily assigned using consecutive numbers, and filenames can be changed optionally, so that the possibility arises that the order of files may be mistaken. Further, even when time stamps or similar are used to manage the order of divided files, until the semiconductor memory is read, it has not been possible to quickly check what data is stored in which semiconductor memory devices.

It is desirable to reconstruct divided materials (clips) into an original long-duration material without difficulty, when the long-duration material (clip) is divided and recorded on memory cards or other recording media.

According to an embodiment of the present invention, in the case where a material including video and/or audio information is recorded on recording media, the material is divided into a plurality of divided materials, and reproduction procedure information describing the recording information of the plurality of divided materials is prepared for each divided material. The divided materials and reproduction procedure information are recorded on the recording media. Further, divided materials and reproduction procedure information recorded on recording media in this manner are reproduced, and the order of reproduction of the divided materials is controlled.

Accordingly, while referencing the reproduction procedure information, a plurality of divided materials can be consecutively reproduced.

According to an embodiment of the present invention, recorded reproduction procedure information is referenced, and a plurality of divided materials can be continuously reproduced, so that even when a long-duration material is recorded across a plurality of recording media, there is the advantageous result that the divided materials can easily be reconstructed into the original long-duration material.

BRIEF DESCRIPTION OF THE DRAWINGS

FIG. 1 is a block diagram showing an example of the internal configuration of the image capture apparatus according to an embodiment of the present invention;

FIG. 2 is an explanatory diagram showing an example of successive reproduction of a clip using an EditList according to an embodiment of the present invention;

FIG. 3 is an explanatory diagram showing a description example of a first EditList (successive reproduction) according to an embodiment of the present invention;

FIG. 4 is an explanatory diagram showing a description example of a first EditList (parallel reproduction) according to an embodiment of the present invention;

FIG. 7 is an explanatory diagram showing a description example of a third EditList according to an embodiment of the present invention;

FIG. 8 is an explanatory diagram showing a description example of a fourth EditList according to an embodiment of the present invention;

FIG. 12 is an explanatory diagram showing a description example of an i-th EditList according to an embodiment of the present invention;

FIGS. 13A to 13C are explanatory diagrams showing an example of an intermediate EditList according to an embodiment of the present invention;

FIG. 14 is an explanatory diagram showing a description example of an n-th EditList according to an embodiment of the present invention;

FIG. 16 is an explanatory diagram showing a description example of a first EditList according to an embodiment of the present invention;

FIG. 17 is an explanatory diagram showing a description example of an i-th EditList according to an embodiment of the present invention;

FIG. 18 is an explanatory diagram showing a description example of an n-th EditList according to an embodiment of the present invention;

FIG. 19 is an explanatory diagram showing a description example of metadata for an original clip according to an embodiment of the present invention;

FIG. 20 is an explanatory diagram showing a description example of an EditList with exclusion of invalid frame intervals, according to an embodiment of the present invention;

DESCRIPTION OF THE PREFERRED EMBODIMENTS

Figures 5, 6:
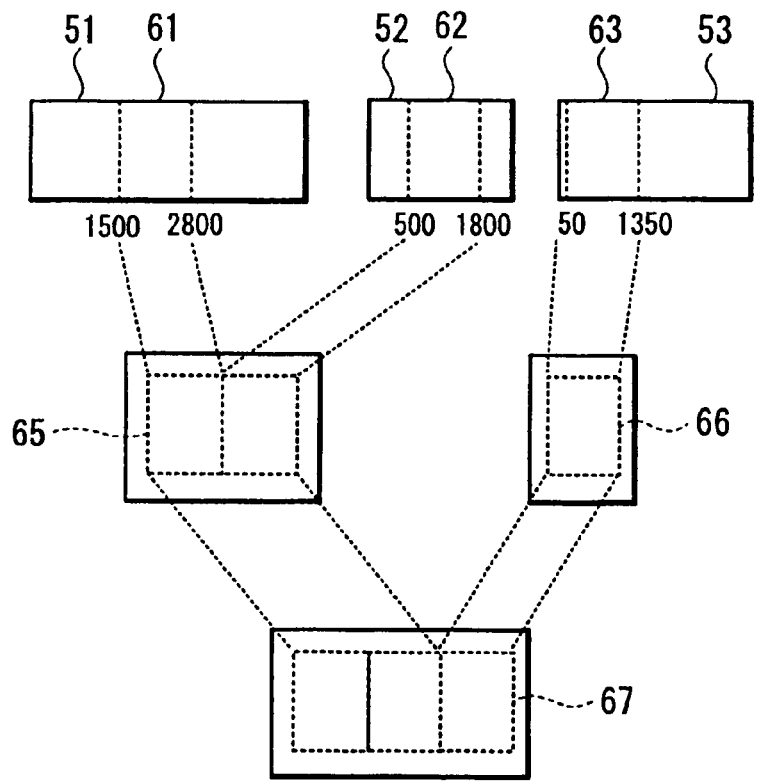
FIG. 5 is an explanatory diagram showing an example of an EditList referenced by another EditList according to an embodiment of the present invention.
FIG. 6 is an explanatory diagram showing a description example of a second EditList according to an embodiment of the present invention.

Embodiment of the invention are hereinafter explained, referring to the attached drawings. In this embodiment, an example is explained of application to an image capture apparatus 1 in which a plurality of removable recording media can be used to record and reproduce video and audio.

FIG. 1 is a block diagram showing an example of the internal configuration of the image capture apparatus 1 of this example. The image capture apparatus 1 includes an image capture device 2 which controls a video camera and generates video data, and a recording device 3 which records and reproduces video data, audio data, and metadata to and from semiconductor memory.

First, various units included in the image capture device 2 are explained. Captured image light input from an optical unit 11 having lenses, apertures, filters and similar is photoelectric-converted by an image capture unit 12 having a charge-coupled device (CCD) or similar, to generate analog video signals. The image capture unit 12 then supplies the analog video signals to a video processor 13 including an analog/digital converter, image adjustment functions, and similar. The video processor 13 converts the supplied analog video signals into digital video signals, and performs image adjustment. Then, the video processor 13 supplies the converted digital video signals to a video signal compression unit 16, which compresses digital video signals using a predetermined method. The video signal compression unit 16 compresses the supplied digital video signals using an MPEG (Moving Picture Experts Group) method. Then, the video signal compression unit 16 supplies the compressed video signals to a data bus 20 via a video interface 17. The compressed video signals are supplied to the recording device 3 via a recording device interface 26 described below, and are stored in a first or second semiconductor memory, described below. Various signals, data, and similar used in the image capture device 2 are transmitted to respective units via the data bus 20.

As a result of user operation using an operation unit 39 described below, operation signals are supplied from the recording device 3, via an image capture unit interface 41 described below, the recording device interface 26, and the data bus 20, to a CPU (Central Processing Unit) 21 which controls processing of each of the units in the image capture device 2. The CPU 21 interprets the supplied operation signals. When interpreting operation signals, the CPU 21 reads out a control program with predetermined timing from a ROM (Read-Only Memory) 22, and temporarily stores temporary data, parameters, and similar, in a RAM (Random Access Memory) 23 to which writing is possible.

The CPU 21 converts operation signals supplied from the operation unit 39 into control signals which drive the image capture unit 12, and supplies the signals to a camera controller 14 via a camera controller interface 15. The camera controller 14 performs diaphragm control, zooming, filtering, and other control operations based on the supplied control signals. The CPU 21 supplies image processing signals which give instructions for image processing to the video processor 13, via a video processor interface 18. The video processor 13 performs compression processing and similar on digital video signals, based on the supplied image processing signals.

The image capture device 2 is provided with a viewfinder 25, which displays an image being captured, reproduced images, metadata, and similar. Images being captured, reproduced images, metadata, and similar transmitted over the data bus 20 are displayed, via a viewfinder interface 24, on the viewfinder 25, which has a liquid crystal screen.

Next, the various units included in the recording device 3 are explained. A microphone 30 directed in the direction of an object captures sound in the surroundings, and generates analog audio signals. The microphone 30 supplies analog audio signals to an audio processor 31 which includes an analog/digital converter, voice adjustment functions, and similar. The audio processor 31 converts the supplied analog audio signals into digital audio signals and performs audio adjustment. The audio processor 31 then supplies the digital audio signals to a data bus 50 via an audio interface 32. The digital audio signals are stored in a first or second semiconductor memory, described below. Various signals, data, and similar used in the recording device 3 are transmitted to respective units via the data bus 50.

The operation unit 39 provided with buttons, switches and similar not shown is used for recording, reproduction, and editing operations of the image capture device 2 and recording device 3. Through manual operations such as initiating image capture, the operation unit 39 generates operation signals. The generated operation signals are supplied to a CPU 34, which controls processing of respective units in the recording device 3, from the operation unit 39, via an operation unit interface 40 and the data bus 50. In addition, at the time of recording, operation signals are supplied to the image capture device 2 via the image capture unit interface 41, described below. The CPU 34 interprets the supplied operation signals, and reads a control program with predetermined timing from a ROM 35 which can only be read, and in addition temporarily stores in a RAM 36, to which writing is possible, temporary data, parameters, and similar.

The image capture apparatus 1 according to this embodiment is provided with two semiconductor memory interfaces formed into slot shapes. As recording media, a first semiconductor memory device 37a and a second semiconductor memory device 37b can be pushed in the slots, and data can be written and read in order. The first semiconductor memory device 37a with a card shape can be used for data writing and reading upon being pushed into the first semiconductor memory interface 38a. Similarly, the second semiconductor memory device 37b with a card shape can be used for data writing and reading upon being pushed into the second semiconductor memory interface 38b. By using the first semiconductor memory device 37a and the second semiconductor memory device 37b, video data, audio data, metadata, various system setting information, and proxy data can be stored, and metadata and various setting values can be updated. It should be noted that, in the following explanation, the first semiconductor memory device 37a and second semiconductor memory device 37b may each also be called memory cards.

In order to exchange data with the image capture device 2, the image capture unit interface 41 is connected to the data bus 50. Video data captured by the image capture device 2 passes through the recording device interface 26, image capture unit interface 41, data bus 50, and first semiconductor memory interface 38a, and is stored in the first semiconductor memory device 37a. Further, when the storage capacity of the first semiconductor memory device 37a is insufficient, video data is stored in the second semiconductor memory device 37b, via the second semiconductor memory interface 38b.

The CPU 34 causes monitored images, time codes, audio levels, metadata, various menus, and similar to be displayed, via the data bus 50 and a liquid crystal display (LCD) interface 43, on a liquid crystal display unit 44, which has a liquid crystal screen. Video data, audio data and similar read out from the first semiconductor memory device 37a or from the second semiconductor memory device 37b can be displayed on the liquid crystal display (LCD) unit 44 as reproduced video images.

The image capture apparatus 1 is provided with a computer interface 42 used for exchanging data with an external computer. The computer interface 42 is, for example, an interface conforming to the USB standard, and can be connected to an external computer apparatus, not shown, to transmit data, or can be connected to a speaker to emit sounds of reproduced audio data. The image capture apparatus 1 also includes a network interface 45, used to exchange data over a network. The network interface 45 is, for example, an interface conforming to the IEEE (Institute of Electrical and Electronic Engineers) 1394 standard, and can be connected to a server or external computer apparatus, not shown, to transmit data.

Next, a processing example in which the image capture apparatus 1 is used to reproduce, record, and edit images, is explained.

First, the concept of EditList is introduced with its description examples. An EditList describing an original long AV clip is generated at each memory card during the AV clip recording by the image capture apparatus 1, which is then used for reproducing recording, or editing the clip. EditList is defined as data to specify which parts of AV materials to be reproduced. Similar function has been provided so far by data called Edit Decision List or EDL. However, as more IT (Information Technology)-oriented video production environments, where AV material is treated as file, have become common, an edit description tool having richer function than EDL is requested. Hence, the EditList is developed based on the Synchronized Multimedia Integration Language or SMIL, with its descriptive power being enhanced to satisfy the requirements coming from its use in the professional video production environments. According to an embodiment of this invention, an EditList is generated and stored at each memory card.

Here, for simplicity, EditList specifications which are necessary for explaining embodiments of this invention are herein explained. EditLists based upon SMIL are no more than one method of description. Accordingly, whatever a method of describing data, if it is possible to provide functions explained below, then such description is included in the scope of EditLists.

First, an example of successive reproduction of clips using an EditList is explained, referring to FIG. 2. As shown in FIG. 2, a first AV material 51, second AV material 52, and third AV material 53 are given as original clips. A frame interval 1500 to 2800 extracted from the first AV material 51 is called a first clip 61. Similarly, a frame interval 500 to 1800 extracted from the second AV material 52 is called a second clip 62. A frame interval 50 to 1350 extracted from the third AV material 53 is called a third clip 63. The first through third clips are described as Clip1 through Clip3 respectively in an EditList, explained below.

A case in which the first clip 61 through third clip 63 are successively reproduced is explained. At this time, reproduction procedure information for use in successive reproduction of the first clip 61 through the third clip 63 is described in a first EditList 55. The reproduction procedure information includes names specifying the AV materials, and description for designating portions (clips) for actual reproduction in the relevant AV materials. The first EditList 55 is a virtual EditList; in actuality, the first clip 61 through third clip 63 are not edited and connected. The first EditList 55 is hereafter referred to as EditList1 in the following EditList explanations. In the case where the image capture apparatus 1 references the first EditList 55 to reproduce clips, the first clip 61 through third clip 63 are reproduced as a connected reproduction clip 56. The reproduction clip 56 is reproduced according to a direction of an arrow representing a reproduction time axis 57. The first clip 61 through third clip 63 have no overlapping frames.

Next, a description example of the first EditList 55 is explained, referring to FIG. 3, for a case in which successive reproduction is performed. The first EditList 55, which describes reproduction procedure information, is provided as XML (Extensible Markup Language) statements using a <smil> element as a root element. The reproduction procedure information includes frame numbers indicating the start of reproduction and frame numbers indicating the end of reproduction for each divided clip. A name attribute of the <smil> element is the name "EditList1" of the first EditList 55. The <body> element indicating the reproduction procedure is nested in the <smil> element. In addition, <video> elements, indicating successive reproduction in order from the top of the described intervals, are nested in a list below the <body> element. Each <video> element specifies an AV material using a src attribute. A portion in an AV material which is actually reproduced is specified by a clipBegin attribute, indicating the in-point which is the reproduction start position, and a clipEnd attribute, indicating the out-point which is the reproduction end position.

Clip1 through Clip3 are names used in the description of the EditList, but names are not limited to these names. As shown in FIG. 3, abstract names of AV materials such as "Clip1" are used for the values which the src attribute can use. However, values used by the src attribute can be, for example, a path to an AV material file (for example, src="D:¥video¥Clip1.mxf"), or a UMID or other unique identifier to identify the AV material (for example, src="urn:smpte:umid:

060E2B34 . . . FF"), or similar. The clipBegin attribute and clipEnd attribute are values which represent the number of frames from the beginning (frame numbers); but in addition, time codes (for example, clipBegin="hh:mm:ss:ff") or other values can be used as well.

Further, the clipBegin attribute and clipEnd attribute can be omitted. Omission of the clipBegin attribute is regarded as equivalent to specifying the beginning frame (clipBegin="0"). Omission of the clipEnd attribute is regarded as equivalent to specifying the next frame (clipEnd="n+1") after the final frame.

Next, as another representation of a description example of the first EditList 55, a description example of the first EditList 55 is explained, referring to FIG. 4, in the case where a description of parallel reproduction is made possible. FIG. 4 is equivalent to FIG. 3, but is a description example which includes a <par> element.

In FIG. 4, the meanings of the src attribute, clipBegin attribute, and clipEnd attribute in each <video> element are the same as those explained in FIG. 3. The EditList shown in FIG. 4 specifies a reproduction start position for each clip on the reproduction time axis by introducing a new "begin" attribute. The begin attribute is omitted in the <video> element which references "Clip1". Here, the meaning is that begin="0" is specified in the <video> element which references "Clip1", that is, reproduction of the first clip 61 is started from the beginning position on the reproduction time axis. In the <video> element which references "Clip2", the begin attribute value is 1300. Here, the meaning is that reproduction of the second clip 62 begins at frame 1300 on the reproduction time axis, that is, immediately after the end of reproduction of the first clip 61. Further, in the <video> element which references "Clip3", the begin attribute value is 2600. Here, the meaning is that reproduction of the third clip 63 begins at frame 2600 on the reproduction time axis, that is, immediately after the end of reproduction of the second clip 62.

As shown in FIG. 4, by introducing <par> elements into the EditList, descriptions such as overlapping reproduction of a plurality of specified intervals are possible. For example, there are such cases in which transition effects should be represented, or there may be a need for overlapping representation of a plurality of intervals. In order to effect such representations, a <par> element is introduced, and the <par> element is inserted between the <body> element and the <video> elements. At this time, intervals specified by <video> elements can be positioned optionally on the reproduction time axis. However, when only one output port exists, there is a problem of how to interpret a description of overlapping reproduction of a plurality of specified intervals. In this case, as a language specification, the reproduction specification interval of the <video> element positioned at the later stage is given preference. That is, in <video> element descriptions, a reproduced clip in an earlier specified interval is replaced by reproduction in a specified interval specified at a later stage. As a result, when all the begin elements are, for example, omitted in FIG. 4, only the interval described by the <video> element which references the third clip 63 is displayed in the actual display, and the first clip 61 and second clip 62 are not reproduced.

Next, an example of an EditList which references another EditList is explained, referring to FIG. 5. As explained above, an EditList is no more than data describing a reproduction procedure. However, from another point of view, an EditList can be regarded as a virtual secondary material obtained as a result of extracting and editing referenced AV materials. By regarding an EditList as a virtual secondary material, it becomes possible for the src attribute in a <video> element to reference an EditList itself (as a secondary material).

As a specific example, the first clip 61 through third clip 63 extracted from the first AV material 51 through third AV material 53 explained above are studied using FIG. 5. The Clip1 interval, of frames 1500 through 2800 extracted from the first AV material 51, and the Clip2 interval, of frames 500 to 1800 extracted from the second AV material 52, are described as a second EditList 65. In addition, the Clip3 interval, of frames 50 to 1350 extracted from the third AV material 66, is described as a third EditList 66. Further, a fourth EditList 67 is generated by continuously referencing the second EditList 65 and the third EditList 66. The second EditList 65 through fourth EditList 67 are respectively described as the EditList2 through EditList 4.

In this case, the second EditList 65 through fourth EditList 67 are described as shown in FIGS. 6 through 8.

FIG. 6 is a description example of the second EditList 65. The <body> element and <par> element are similar to those in the first EditList 55 shown in FIG. 4. The name attribute of the <smil> element is "EditList2". The src attribute of a <video> element is "Clip1", with a clipBegin attribute of "1500" and a clipEnd attribute of "2800". Further, the second <video> element has a src attribute of "Clip2", a clipBegin attribute of "500", a clipEnd attribute of "1800", and a begin attribute of "1300".

FIG. 7 is a description example of the third EditList 66. The <body> element and <par> element are similar to those in the first EditList 55 shown in FIG. 4. The name attribute of the <smil> element is "EditList3". The src attribute of the <video> element is "Clip3", with a clipBegin attribute of "50" and a clipEnd attribute of "1350".

FIG. 8 is a description example of the fourth EditList 67. The name attribute of the <smil> element is "EditList4". The src attribute of a <video> element is "EditList 2". Further, the src attribute of the following <video> element is "EditList3".

As shown in FIGS. 6 through 8, using the src attribute described in a <video> element, an EditList can itself be referenced. That is, an EditList, which is reproduction procedure information, can reference another EditList. In FIGS. 6 and 7, a <par> element and a begin attribute may be omitted, and <video> elements may be listed directly below the <body> element. Further, in FIG. 8, a <par> element may be inserted directly below the <body> element, and a begin="2600" attribute provided in the lower <video> element.

Figures 9, 10:
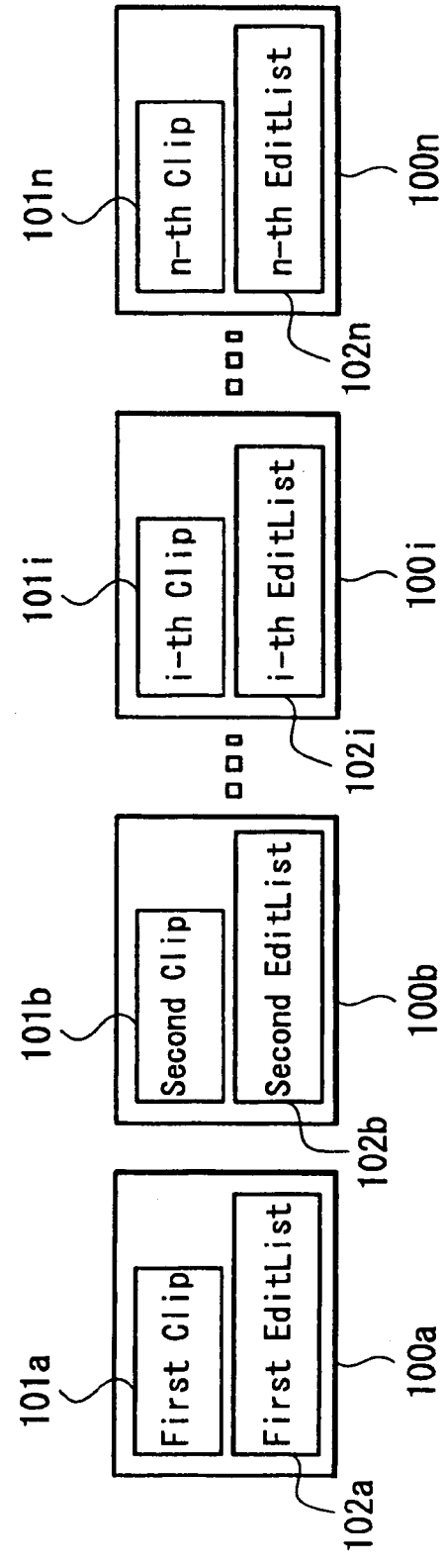
FIG. 9 is an explanatory diagram showing a description example of alt attributes according to an embodiment of the present invention.
FIG. 10 is an explanatory diagram showing an example of a clip and EditList recorded in a memory card according to an embodiment of the present invention.

Next, a description example of an alt attribute introduced as an appended attribute of <video> elements is explained, referring to FIG. 9. The alt attribute describes comments and similar relating to a reference. As shown in FIG. 9, "In Memory Card #3" is added as an alt attribute to the <video> element of the third EditList 66. By means of an alt attribute, information indicating that the third clip 63 is recorded in memory card #3 can be provided.

EditList description examples were explained as described above. However, these are all no more than characteristics originating in SMIL, on which EditLists are based. Further, EditLists are general-purpose tools used to list the portions for reproduction among a plurality of AV materials. Hence, they were not introduced for the purpose of unifying descriptions of divided clips recorded on different memory cards, when recording a long-duration clip extending over a plurality of memory cards.

The divided clips recorded in divided files contained in various memory cards are merely parts of the original long-duration clips. Accordingly, in order to collect divided files and reconstruct an original long-duration clip, auxiliary information describing the positioning of the various divided files (divided clips) within the original long-duration clip may be necessary. In related art, for a certain divided clip, the preceding and following divided clips are identified by some means. This is equivalent to recording, for example, description for a memory card i such as "preceding-direction divided clip='Clip-(i−1)', following-direction divided clip='Clip-(i+1)'", as a file in memory card i.

On the other hand, according to this embodiment, information on the positioning of the divided clips, recorded in the various divided files, in the original long-duration clip is described using EditLists.

Here, an EditList description example is explained, referring to FIG. 10, in a case in which divided clips recorded in a plurality of divided files are handled as a long-duration clip. Here, there is described a case in which long-duration image capture is performed, and the long-duration clip is divided and recorded on n memory cards.

Identifiers to identify the respective memory cards are assigned to the first memory card 100a to the n-th memory card 100n, according to the order of recording on the memory cards. A first clip 101a is recorded and a first EditList 102a is written on the first memory card 100a. A second clip 101b is recorded and a second EditList 102b is written on the second memory card 100b. Similarly, an i-th clip 101i is recorded and an i-th EditList 102i is written on the i-th memory card 100i. Further, an n-th clip 101n is recorded and an n-th EditList 102n is written on the n-th memory card 100n.

In this way, on the i-th memory card is recorded the i-th clip, as a divided clip generated by dividing the original long-duration clip into the i-th portion from the beginning. In the following explanation, when describing an EditList, the first clip 101a is called Clip-1, and the first EditList is called EditList-1. Similarly, the i-th clip is called Clip-i, and the i-th EditList is EditList-i. Further, the n-th clip is called Clip-n, and the n-th EditList is EditList-n.

According to this embodiment, the respective memory cards have EditLists as auxiliary information. However, a major difference of this embodiment from the technology of the related art is the content of the EditLists. That is, the EditLists contained in the respective memory cards independently represent the entirety of an original long-duration clip and the reproduction procedure, rather than simply describing the contextual relation between divided clips.

Figure 11:
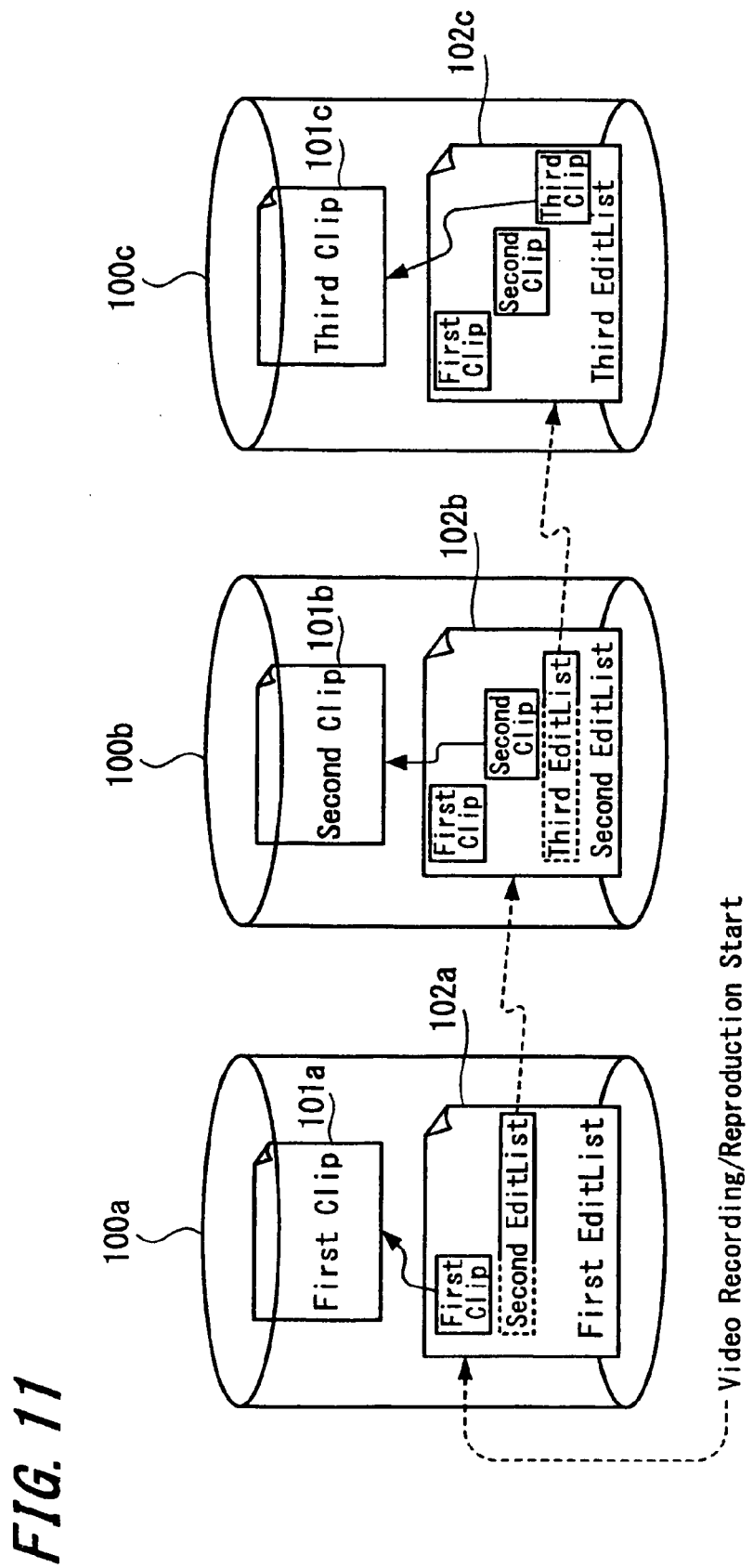
FIG. 11 is an explanatory diagram showing an example of a clip and EditList formed in a memory card according to an embodiment of the present invention.

Here, an example of the concepts of EditLists and clips formed on media is explained, referring to FIG. 11. A certain long-duration clip is here divided, and a first clip 101a through a third clip 101c are provided on a first memory card 100a through a third memory card 100c respectively. When reproduction is started in the image capture apparatus 1, initially the first EditList 102a on the first memory card 100a is accessed. In the first EditList 102a are described information for the first clip 101a and information for the second EditList 102b. Then, the first clip 101a is reproduced. When reproduction of the first clip 101a ends, the image capture apparatus 1 accesses the second EditList 102b on the second memory card 100b. Information for the first clip 101a and second clip 101b, and information for the third EditList 102c, are described in the second EditList 102b. The second clip 101b is then reproduced.

When reproduction of the second clip 101b ends, the image capture apparatus 1 accesses the third EditList 102c on the third memory card 100c. In the third EditList 102c are described information for the first clip 101a through the third clip 101c. Then, the third clip 101c is reproduced. According to the image capture apparatus 1 of this embodiment, for example, with insertion of the second memory card 100b, the positioning of the second clip 101b, recorded in the second memory card 100b, in the entire clip on the reproduction time axis can easily be determined simultaneously.

Further, because in the later stage in which Clip-i is generated the information relating to Clip-1 through Clip-(i−1) is known, this information can be explicitly described in an EditList. That is, EditList-i and EditList-n are described as follows.

Here, a description example of the i-th EditList 102i is explained referring to FIG. 12. The <body> element and <par> element are similar to those in the first EditList 55 shown in FIG. 4. The name attribute of the <smil> element is "EditList-i". The src attribute of the <video> element at the beginning is "Clip-1". <video> elements are similarly listed up to the i-th element. The src attribute of the i-th <video> element is "Clip-i". The src attributes of <video> elements after the i-th element are "EditList-(i+1)", and the clipBegin attributes are "Dur(Clip-1)+ . . . +Dur(Clip-i)". Here, the "Dur" specified in the clipBegin attributes means that, after reproduction of Clip-1 to Clip-n described in <video> elements, the (i+1)-th clip is reproduced. That is, "Dur(Clip-1)+ . . . +Dur(Clip-i)" means that, in the case where the EditList-(i+1) represents an original long-duration clip, the interval from the first clip to the i-th clip, reproduction of which has already ended, is skipped, and reproduction is performed from the (i+1)-th clip. Such an EditList is here called an "intermediate EditList".

Intermediate EditLists

Here, examples in which intermediate EditLists are used in reproduction are listed as follows. There are a case where the number of card slots in the reproduction apparatus is fewer than that of recorded cards; a case where images are monitored during obtaining the images in the order of capture to a server or computer apparatus; and a case where all clips and all EditLists are provided on the server or computer apparatus, but an intermediate clip is selected.

An intermediate EditList is prepared at an intermediate stage on a memory card during recording. Clips subsequent to the recorded card are not yet determined during recording, but when the memory card being recorded is switched, consecutive memory cards exist in the image capture apparatus 1, so that names identifying the clips and EditList of the next memory card, for example UMIDs, can be written. Hence, intermediate EditLists are written to each memory card, containing the clips and EditLists on the card itself. If only the UMID for the next clip is written as in the related art, then only the preceding and following clips can be checked, and so the positional information for all clips may not be connected, and later it is necessary to search for the next EditList. On the other hand, if a method of referencing EditLists is used as in this embodiment, then when tracing EditLists one after another, all EditLists are logically equivalent, that is, reproduction of the original long-duration clip is represented. For this reason, reproduction failures due to user selection errors or similar can be prevented.

Here, description examples of intermediate EditLists are explained referring to FIGS. 13A to 13C. FIG. 13A shows a description example for a first EditList. A filename of the first EditList is ABCD1001E01.SMI. A file ABCD1001Q01.MP4 is stored in the first memory card, in which the first EditList is described. FIG. 13B shows a description example for a second EditList. A filename of the second EditList is ABCD1001E02.SMI. A file ABCD1002Q01.MP4 is stored in the second memory card, in which the second EditList is described. FIG. 13C shows a description example for a third EditList. A filename of the third EditList is ABCD1001E03.SMI. The file ABCD1003Q01.MP4 is stored in the third memory card, in which the third EditList is stored. The reproduction procedure information written in the first EditList through the third EditList includes, for each divided clip, time information representing the start of reproduction and time information representing the end of reproduction.

The first EditList shown in FIG. 13A indicates that the file ABCD1001Q01.MP4 is reproduced from "00:00:00:00" to "00:29:59:29", and subsequently the second EditList is referenced and reproduction is begun from "00:30:00:00". The second EditList shown in FIG. 13B indicates that the file ABCD1002Q01.MP4 is reproduced from "00:30:00:00" to "00:59:59:29", and subsequently the third EditList is referenced and reproduction is begun from "01:00:00:00". The third EditList shown in FIG. 13C indicates that the file ABCD1003Q01.MP4 is reproduced from "01:00:00:00" to "01:09:59:29". In this way, information on clips reproduced is described in each of the first through third EditLists, and so by referencing each other, the positions of divided clips in the entire clip can be obtained. The final ABCD1001E03.SMI is the complete version of a "comprehensive EditList", described below.

Next, a description example of the n-th EditList $102n$ is explained, referring to FIG. 14. The <body> element and <par> element are similar to those of the first EditList 55 shown in FIG. 4. The name attribute of the <smil> element is "EditList-n". The src attribute of the initial <video> element is "Clip-1". <video> elements are listed similarly, up to the n-th element. That is, as shown in FIG. 14, EditList-n no longer represents indirect descriptions through other intermediate EditLists, but directly references all the divided clips (Clip-1 to Clip-n). Such EditList is called a comprehensive EditList.

Comprehensive EditList

Here, examples in which comprehensive EditList is used in reproduction are listed as follows. There are a case where the number of memory card interfaces in the reproduction apparatus is fewer than that of recorded memory cards; and a case where all clips and a comprehensive EditList are present on a server or computer apparatus.

During video recording, the above-described comprehensive EditList is provided only in the final memory card. The reason for providing only in the final memory card is that, in the middle of recording, the comprehensive EditList has not been finalized. The contents of the comprehensive EditList are a list of <video> elements which reference divided clips from the beginning, such as ABCD1001Q01.MP4, ABCD1002Q01.MP4, and so on. The comprehensive EditList itself also has a specific name, such as UMID, and the connected result can be handled as a single clip, that is, as an original long-duration clip.

Figures 15A, 15B:
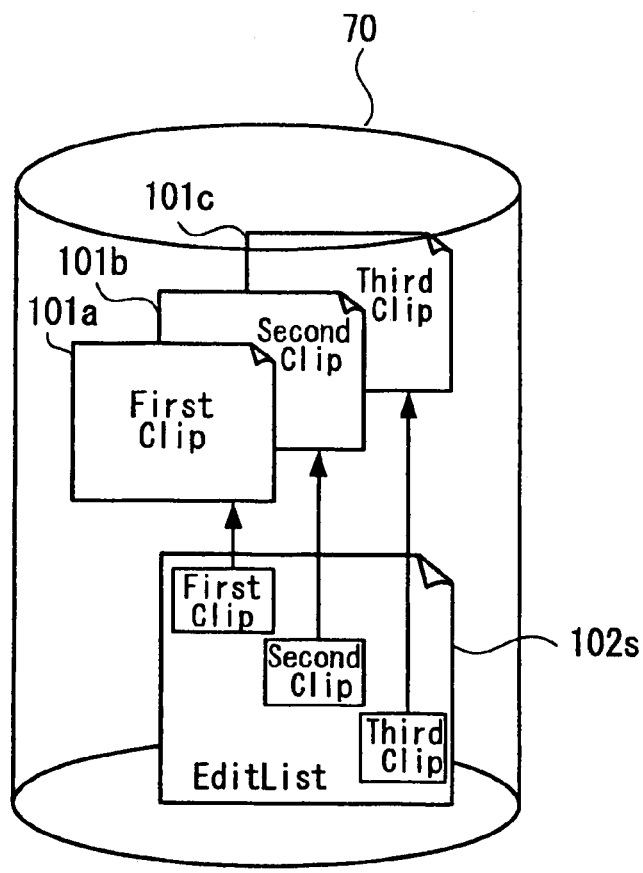
FIGS. 15A and 15B are explanatory diagrams showing an example of a comprehensive EditList according to an embodiment of the present invention.

Here, a configuration example of the comprehensive EditList is explained, referring to FIGS. 15A and 15B. FIG. 15A shows a conceptual example of first through third clips and an EditList, stored on a server. The clips, read from a plurality of memory cards, are stored on a server 70. When performing reproduction and editing on the server 70, an EditList 102s, in which are described the first clip $101a$ through the third clip $101c$, is used.

FIG. 15B shows a description example for a comprehensive EditList. The EditList 102s functions as a comprehensive EditList in the server 70. In the EditList 102s appear src attributes specifying "ABCD1001Q01.MP4", which is the filename of a first clip $101a$, "ABCD1002Q01.MP4", which is the filename of a second clip $101b$, and "ABCD1003Q01.MP4", which is the filename of a third clip $101c$, as well as clipBegin and clipEnd attributes, specifying the respective intervals for reproduction. By referencing this EditList 102s, the server 70 can check the position on the reproduction time axis of a certain divided clip in the entire original long-duration clip.

As described above, description examples have been explained using FIGS. 12 and 14 for an i-th EditList and for the n-th EditList. However, these can be written differently as indicated below. In the following, FIGS. 16 through 18 are referenced to explain other description examples for a first EditList recorded in a first memory card, an i-th EditList recorded in an i-th memory card, and an n-th EditList recorded in an n-th memory card.

First, a description example for a first EditList $102a$ is explained referring to FIG. 16. The name attribute of the <smil> element is "EditList-1". The src attribute of a <video> element is "Clip-1". The src attribute of the next <video> element is "EditList-2", with a clipBegin attribute of "Dur (Clip-1)". By means of these specifications, after the end of reproduction of the first clip, the second EditList is retrieved, the portion already reproduced is skipped, and the subsequent reproduction can be performed.

Next, a description example of an i-th EditList $102i$ is explained, referring to FIG. 17. The name attribute of the <smil> element is "EditList-i". The src attribute of the beginning <video> element is "EditList-(i−1)", and the clipEnd attribute is "Dur(Clip-1))+ . . . +Dur(Clip-(i−1))". The src attribute of the next <video> element is "Clip-1". In addition, the src attribute of the last <video> element is "EditList-(i+1)", while the clipBegin attribute is "Dur(Clip-1)+ . . . +Dur (Clip-i)". By means of these specifications, after reproduction of the first through the (i−1)-th clips, the i-th clip is reproduced, the (i+1)-th EditList is retrieved, the portion already reproduced is skipped, and the subsequent reproduction can be performed.

Next, a description example of an n-th EditList $102n$ is explained referring to FIG. 18. The name attribute of the <smil> element is "EditList-n". The src attribute of the beginning <video> element is "EditList-(n−1)", and the clipEnd attribute is "Dur(Clip-1)+ . . . +Dur(Clip-(n−1))". In addition, the src attribute of the next <video> element is "Clip-n". By means of these specifications, after reproduction of the first through (n−1)-th clips, the n-th clip can be reproduced, and reproduction processing ends.

As shown in FIG. 17, in addition to directly referencing the Clip-i recorded in memory card i, EditList-i also references EditList-(i−1) recorded on the memory card (i−1) positioned before Clip-i, and EditList-(i+1) recorded on the memory card (i+1) positioned after the Clip-i.

If the time duration (or number of frames) of Clip-1 is represented by Dur(Clip-i), then EditList-(i−1) and EditList-(i+1) both represent reproduction of the entire original long-duration clip, and so the beginning <video> element represents reproduction from the beginning of the original long-duration clip until immediately before the start of Clip-i contained in memory card i. Further, the third <video> element represents reproduction from immediately after the end of Clip-i in the original long-duration clip until the end. As a result, EditList-i also represents (a method of reproducing) the entirety of the original long-duration clip.

The EditList description examples shown in FIGS. 16 and 18 are equivalent to descriptions at the beginning and at the end of a series of referencing the long-duration clip. That is, in FIG. 16, Clip-1, which is the beginning divided file recorded in the first memory card, is directly referenced and reproduced. Subsequently, the remainder of the original long-duration clip, skipping the Clip-1 portion reproduced from the beginning, is reproduced. Through reproduction in this manner, reproduction of the entirety of the original long-duration clip is represented. In FIG. 18, the original long-duration clip is reproduced, excluding the portion from the beginning to Clip-(n−1), which is the final divided file. Then, Clip-n is directly referenced and reproduced. Through this reproduction, reproduction of the entirety of the original long-duration clip is also represented.

Here, it should be noted that when, for example, generating EditList-1, the omission of the clipEnd attribute as described above is interpreted as indicating the end of the relevant material (or more precisely, the next frame after the last frame). Accordingly, even in the case where the time duration of the entire original long-duration clip is unknown at the time EditList-1 is generated, it is still possible to generate EditList-1. That is, the information used for generating EditList-1 is the time duration of Clip-1 and information for referencing EditList-2 in the second memory card (a filename or identifier as a name for referencing the EditList), and so upon completion of generating Clip-1, which is the divided file in the first memory card, EditList-1 can be generated.

In this embodiment, EditLists were described based on representations of successive reproduction without including <par> elements. In addition to this, it is also possible to describe EditLists based on representations which perform parallel reproduction using <par> elements. In this case, each of the reproduction positions on the reproduction time axis may need to be specified. However, in all cases reproduction positions correspond to clipBegin attribute values and clipEnd attribute values, and are known at the time generating EditList.

Adding Titles

Next, an EditList description example for a case in which a title and comment are added to an original long-duration clip is explained, referring to FIG. 19. FIG. 19 shows a description example in which a title is added utilizing the fact that all EditLists represent reproduction procedure information for the entirety of the original long-duration clip. That is, the reproduction procedure information added to an EditList is information common to all of the plurality of divided clips.

In FIG. 19, the targetclip attribute of the <Metadata> element is "EditList-n". Further, the <title> element is "My long AV clip". Further, the <Description> element is "World Cup Football Game". Specifying an arbitrary EditList as a reference is equivalent to assigning the title "My long AV clip", and the comment "World Cup Football Game", to the original long-duration clip.

Invalid Frame Intervals

Next, an EditList description example for a case in which the effect of an invalid frame interval existing in a recorded clip is explained, referring to FIG. 20. When recording data in GOP units using an inter-codec method, there are cases in which an invalid frame interval exists at the beginning and the end of a clip, though outside the valid intervals, including recorded frames required for data compression. If such a clip were merely specified in an EditList using a clip name, duplication could occur on the reproduction time axis. In order to exclude such invalid frame interval, an EditList shown in FIG. 20 is described.

In a Clip-i including 128 frames, the valid frame area is frames 3 to 120. In this case, the src attribute of the second <video> element is "Clip-i", the clipBegin attribute is "3", and the clipEnd attribute is "121". By thus specifying the clipBegin and clipEnd attributes, the effect of invalid frame intervals can be excluded, and successive reproduction without overlap is possible.

Further, there are cases in which, due to failures or similar occurring in the middle of data recording, recording may be interrupted, and recorded data may be lost. Against such possibilty, a "salvage" technique may be used in which data is recorded with redundancy for use in data regeneration. Here, only a clip is addressed in salvaging, without application to an EditList. Accordingly, when memory cards are switched during video recording, the EditList written to the previous memory card is also written to the subsequent memory card, and in the "salvage" processing stage, the last line of the EditList is rewritten to the name of the clip recorded together with the EditList. By specifying an appropriate clipEnd value, the comprehensive EditList can be regenerated.

Next, a processing example is explained for a case in which a clip is reproduced using an EditList. Here, there is explained such a case in which an EditList is given and processing of successively reproducing specified intervals of a plurality of AV materials is performed based on the EditList. The reproduction processing is equivalent to reconstruction of the original long-duration clip by connecting divided files based on the EditList recorded in a certain memory card. In order to simplify the explanation, the specifications of the EditList for the processing are here limited to those described above, without overlap of specified intervals or gaps between specified intervals.

Reproduction Interval List

Figure 21:
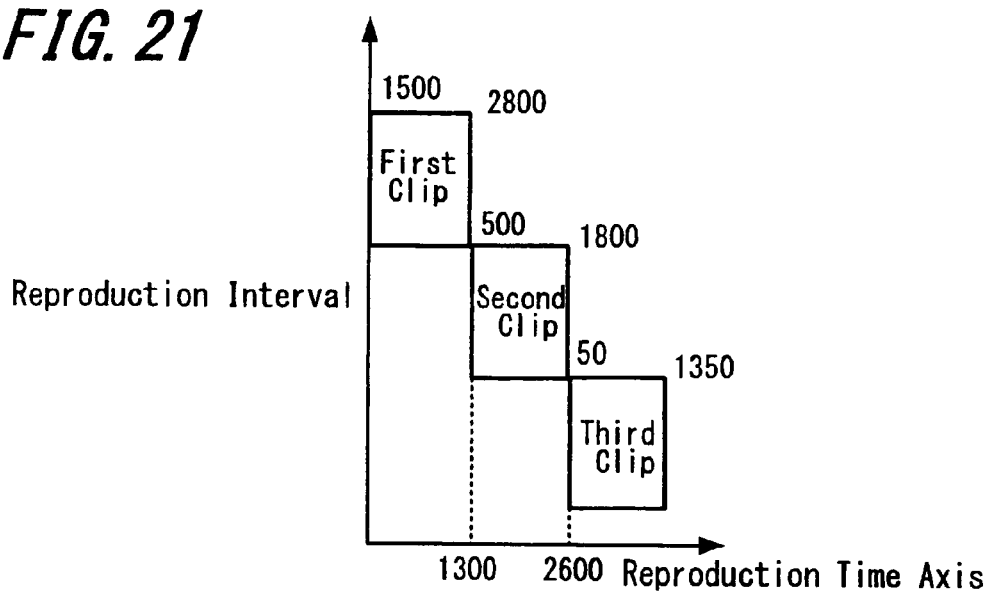
FIG. 21 is an explanatory diagram showing an example of a reproduction interval list according to an embodiment of the present invention.

First, the data required by the image capture apparatus 1 to perform reproduction processing using an EditList is explained, referring to FIG. 21. FIG. 21 schematically shows data required by the image capture apparatus 1, referring to the clip example explained in FIG. 2, indicating the clips referenced as actual data and the reproduced interval as lists, with the vertical axis as the reproduction interval and the horizontal axis as the reproduction time axis. Here, clips for reproduction are referenced using clip names, and the interval for reproduction is represented using the frame numbers of the in-points and out-points for clips, arranged on the reproduction time axis. In the following explanation, such data is called the reproduction interval list.

Processing of a Reproduction Interval List

Figure 22:
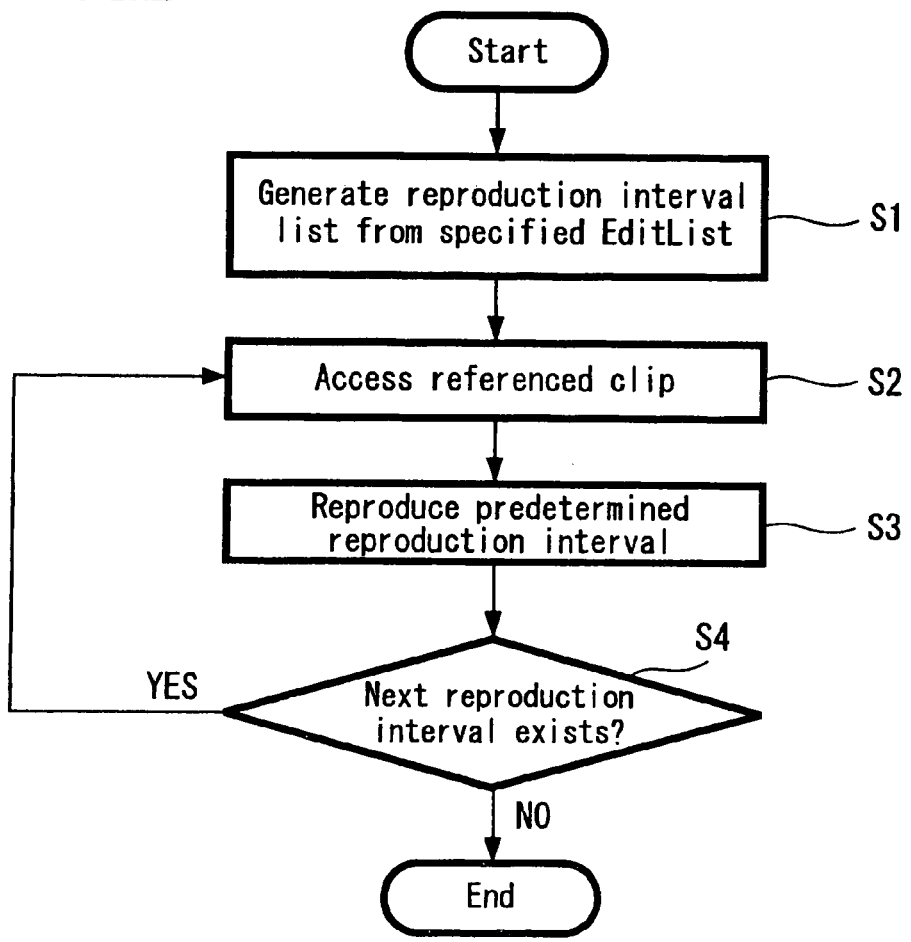
FIG. 22 is a flowchart showing an example of processing of a reproduction interval list according to an embodiment of the present invention.

Next, reproduction interval list processing is explained, referring to FIG. 22. FIG. 22 is a flowchart showing an example of reproduction processing in the case of successively reproducing predetermined intervals based on a given EditList.

First, the specified EditList is converted into a reproduction interval list, which is stored within the image capture apparatus 1 (step S1). A detailed example of the processing of step S1 is described below. Subsequently, clips are accessed according to items listed in the reproduction interval list (step S2). Specifically, processing is performed to open the file storing a referenced clip, advance the read pointer to the starting position for a predetermined reproduction interval, and similar.

Then, the clip for the predetermined reproduction interval is read and reproduced (step S3). After reproducing the clip for the predetermined reproduction interval, whether a next reproduction interval exists is determined (step S4). If there is a next reproduction interval, processing returns to step S2. If there is no next interval for reproduction, processing ends.

Processing for Conversion to a Reproduction Interval List

Figure 23:
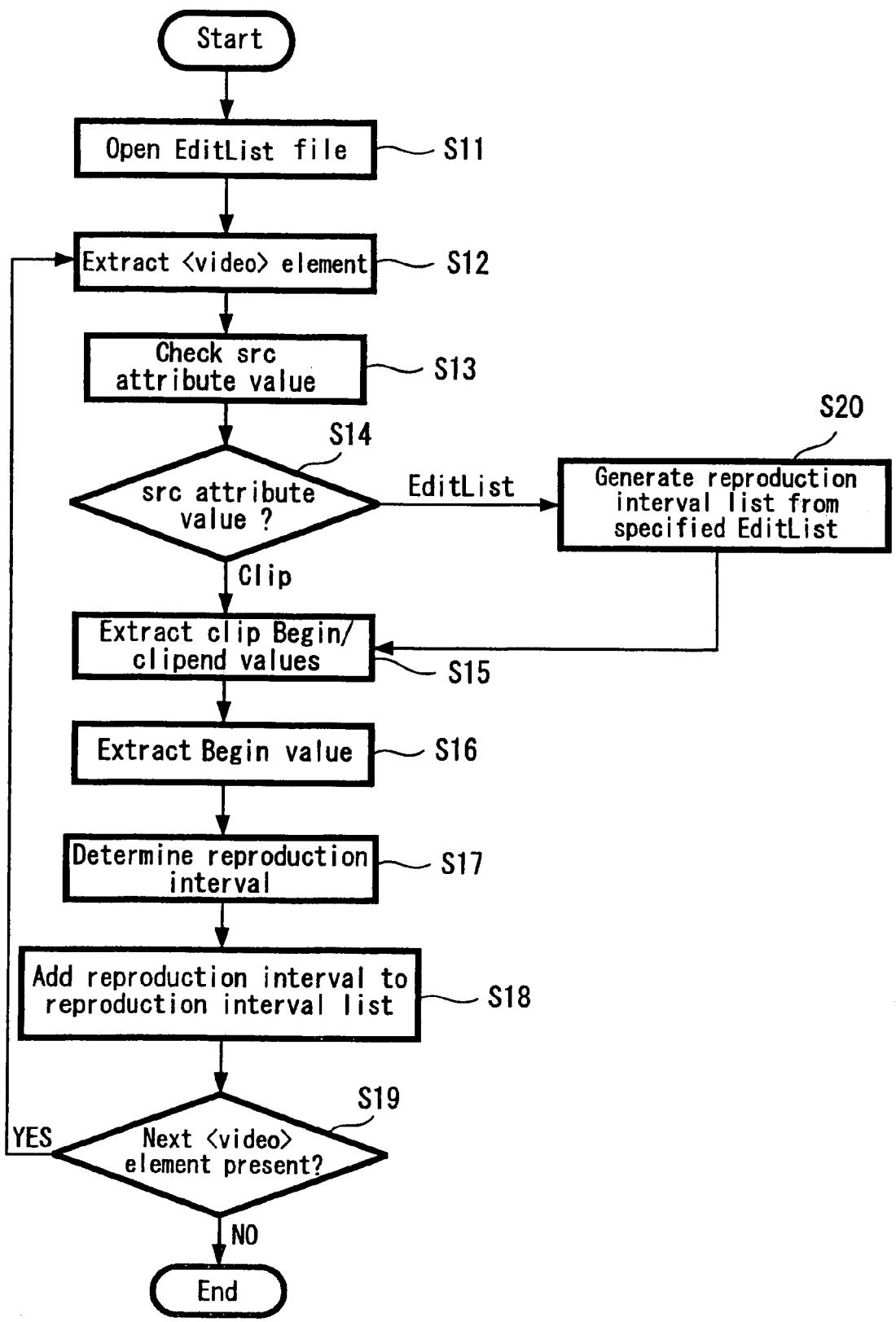
FIG. 23 is a flowchart showing an example of conversion processing from an EditList to a reproduction interval list according to an embodiment of the present invention.

Next, an example of processing of converting an EditList to a reproduction interval list is explained, referring to FIG. 23. FIG. 23 explains in further detail the processing of step S1 in FIG. 22 (processing to generate a reproduction interval list).

First, the file in which the specified EditList is stored is opened (step S11). Subsequently, <video> elements are detected, and syntax analysis is performed (step S12). Further, src attribute values are extracted, and the presence of referenced AV materials is confirmed. If a referenced AV material does not exist, reproduction is not possible, and so an error is reported and processing ends (step S13).

If the AV materials exist, whether an AV material referenced by a src attribute is a clip or an EditList is determined (step S14). If a referenced AV material is an EditList, the EditList is used as an input to recursively call the processing flow of FIG. 23, to generate a reproduction interval list (step S20), and processing proceeds to step S15.

If a referenced AV material is a clip, the clipBegin attribute value and clipEnd attribute value are extracted in order to specify the reproduction interval of the referenced AV material (or of the net result of the reproduction interval list obtained in step S20) (step S15). In addition, a begin attribute value, which is a value specifying the reproduction start position on the reproduction time axis, is extracted (step S16). Based on the extracted clipBegin attribute value and clipEnd attribute value, the reproduction interval on the reproduction time axis is determined for the referenced AV material, or for the reproduction interval list obtained in step S20 (step S17).

Subsequently, the reproduction interval thus determined is appended to the reproduction interval list (step S18). The presence of a next <video> element is then checked (step S19). If there exists no next <video> element, then all <video> elements have been processed, and so processing ends. If there exists a next <video> element, then processing returns to step S12 to process the unprocessed <video> element, and the subsequent processing is repeated.

Reproduction Processing

Figure 24:
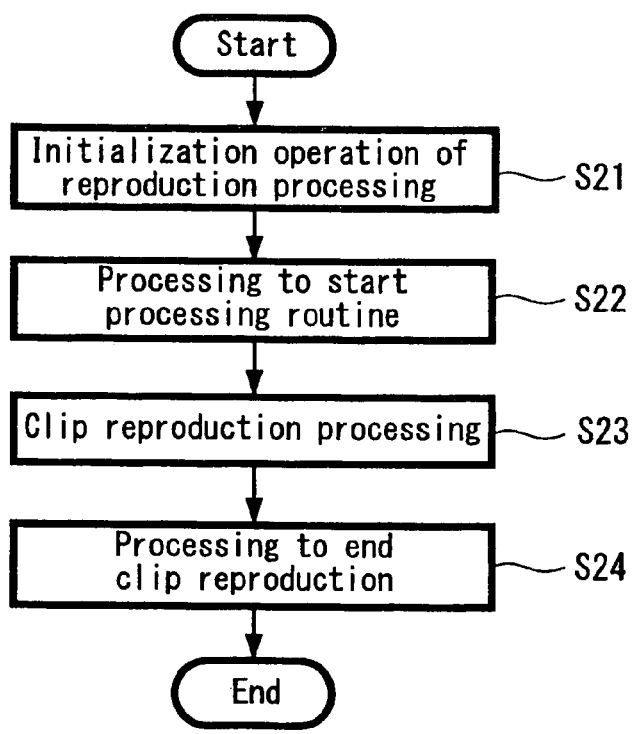
FIG. 24 is a flowchart showing an example of reproduction processing according to an embodiment of the present invention; and, FIG. 25 is a flowchart showing an example of recording processing according to an embodiment of the present invention.

Processing to reproduce a certain EditList is similar for both a comprehensive EditList and for an intermediate EditList. The sole difference is whether another EditList is referenced or not. The reproduction processing of the image capture apparatus 1 may not be different from a typical SMIL reproduction procedure, but for understanding and reference, the processing flow is explained referring to the flowchart shown in FIG. 24. The arguments used in processing are the filename and the reproduction start time.

First, initialization operation for the reproduction processing is started (step S21). The EditList to be reproduced is selected here by the user. In the case where a UMID is used to specify the EditList to be reproduced, the UMID is name-resolved to obtain a filename. Subsequently, the filename and the reproduction start time=0 are used as arguments to start the processing routine.

Next, processing to start the processing routine is performed (step S22). If the file to be reproduced is not found, the user is prompted to mount a memory card, and processing waits until the memory card is mounted. If the file to be reproduced is found, the file is opened, and the EditList is skipped up to the reproduction starting time of an argument. Subsequently, the UMID at the point past the skipped portion is name-resolved to obtain a filename.

Next, clip reproduction processing is performed (step S23). If the file in which the clip to be reproduced is stored is not found, the user is prompted to mount a memory card, and processing waits until the memory card is mounted. If the file to be reproduced is found, the clip file is opened. Subsequently, if the beginning of the video data recorded in the clip is different from the reproduction start time, the video data is skipped in the amount of the difference. Subsequently, processing waits until the reproduction module permits input of data, and the length (clipEnd attribute value minus clipBegin attribute value) is used as an argument to start the reproduction module.

Next, clip reproduction ends (step S24). The image capture apparatus 1 here waits until clip reading has ended. However, clip reading is fast, and so reproduction continues. The EditList is read, and then the next UMID for reproduction is determined, and a filename is obtained. The reproduction start time for the next EditList or clip is calculated from the clipBegin attribute. If the next item for reproduction is an EditList, processing proceeds to step S22. If the next item is a clip, processing proceeds to step S23. If there is no next EditList or clip, reproduction processing ends.

Recording Processing

Figure 25:
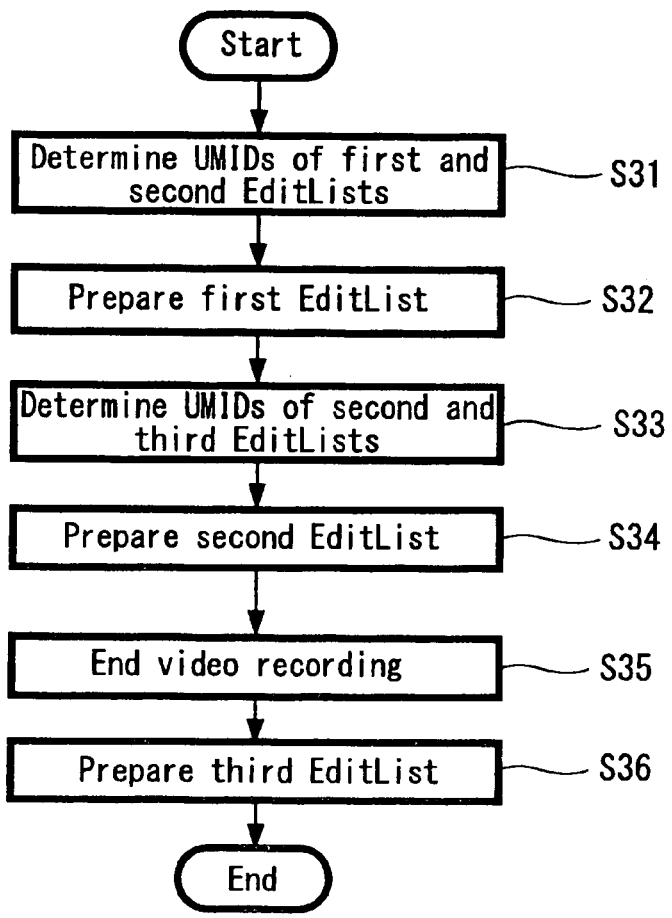

Next, an example of processing performed when a long-duration clip is divided and is recorded, as divided clips, on a plurality of memory cards is explained, referring to FIG. 25. In order to associate the divided clips across a plurality of memory cards, EditLists are used. Here, EditLists can be used in cases in which successive reproduction is performed after the contents of all the memory cards have been copied to a server or similar in advance, and in cases in which successive reproduction is performed by reading directly from memory cards, while exchanging the memory cards. If the whole clip can be checked, then a comprehensive EditList, which connects the plurality of divided clips for handling as the original long-duration clip, is convenient. In such case, the EditList employs a format in which the divided clips are described in the order of reproduction, as explained in FIG. 3. Here, the respective divided clips may be referenced using UMIDs as names identifying the clips.

A comprehensive EditList is finalized at the time video recording ends. Accordingly, even when there are two memory card interfaces, if the number of memory cards used in video recording is three or greater, then the comprehensive EditList may not be finalized and written other than the final memory card. Hence, intermediate EditLists are recorded on the other memory cards than the final memory card, and in the line following the UMID of the card's own clip, the UMID of the EditList of the next memory card is written. Thus, a desired clip can be accessed through indirect reference. The next EditList is written in the EditList, and so by tracing these in this order, the final clip can be reached. That is, the EditLists written to each memory card are all equivalent through multi-stage reference, and all represent the original long-duration clip; the entirety of the original long-duration clip can be reproduced no matter from which EditList reading is begun.

Here, an example of recording processing by the image capture apparatus 1 is explained. During clip recording, if the remaining capacity of the first memory card becomes very small and there remains free capacity in a second memory card, and moreover, continuous recording has been selected in the user settings, the following processing is performed. Here, the initial clip placed in the first memory card represents the first clip. At this time, the first and second memory cards are inserted into the image capture apparatus 1.

First, recording is performed, and when the remaining capacity of the first memory card becomes very small, and there is free capacity in the second memory card, the UMID of the first EditList written to the first memory card and the UMID of the second EditList written to the second memory card are determined (step S31). The clip placed in the second memory card represents the second clip.

Then, the first clip is closed, the second clip is opened in the second memory card, and video recording is continued. Using the UMID of the first clip, the length (clipEnd attribute value minus clipBegin attribute value), and the UMID of the second EditList, the first EditList is prepared and is recorded in the first memory card (step S32). Also, the contents of the first EditList are stored in RAM 36 in the image capture apparatus 1. Then, the first memory card is removed, and a third memory card is inserted. At this time, the second and third memory cards are inserted into the image capture apparatus 1.

Recording is continued, and when the remaining capacity of the second memory card becomes very small, and there is free capacity in the third memory card, the UMID of the second EditList written to the second memory card and the UMID of the third EditList written to the third memory card are determined (step S33).

Then the second clip is closed, a third clip is opened in the third memory card, and video recording is continued. The UMID and length of the second clip, and the UMID of the third EditList, are used to prepare the second EditList, which is recorded in the second memory card (step S34). The contents of the second EditList are stored in the RAM 36 of the image capture apparatus 1.

Subsequently, the user operates the operation unit 39 to end video recording (step S35). When an instruction to end video recording is given, the third clip is closed. The second EditList, the UMID and length of the third clip, and the UMID of the third EditList are used to prepare the third EditList, which is recorded in the third memory card (step S36). Here, the third EditList represents the above-described comprehensive EditList.

According to the above-described embodiment, it is possible to generate EditLists describing reference information for arbitrary clips, files, and similar recorded on AV materials in general-use formats. That is, when a function of continuously reproducing a plurality of divided clips is supported based on EditLists, there is the advantageous result that the divided clips obtained by dividing a long-duration clip can be reproduced as the original long-duration clip, without adding particular processing. Further, the EditLists do not depend on the file format of the clips themselves, and there may be no need to add particular processing or functions using a user area in the clips. Thus, EditLists can be used for general-purpose recording, reproduction, and editing processing of data, and there is the advantageous result that recording, reproduction, and editing can be performed without depending on specific equipment models or functions.

Moreover, according to the embodiment of the present invention, positions on the time axis of respective divided clips in the original long-duration clip can be stated explicitly in the EditList. That is, positioning of a Clip-i is equivalent to the value obtained by subtracting the time duration of Clip-i from the clipBegin attribute value of the <video> element referencing EditList-(i+1) in EditList-i. Accordingly, even when a long-duration clip is recorded across a plurality of memory cards, there is the advantageous result that a memory card is inserted into the image capture apparatus and at a time, the positioning on the time axis of a divided clip relative to the long-duration clip can easily be determined.

EditLists can be referenced to each other, and can pass on information from other EditLists. Hence there is the advantageous result that complex settings may not be needed for respective media, EditLists and so on to reference clips. Further, because an EditList simply represents information for a data reproduction procedure, the EditList has no effect on the clips or files in which data is actually stored. Hence, there is the advantageous result that EditLists can easily be rewritten.

Further, according to the embodiment of the present invention, information referencing divided files is described in all EditLists, so that there is the advantageous result that even if a certain EditList is lost, the effect thereof can be minimized. In particular, the final, comprehensive EditList (EditList-n) has complete information and is independent of the other EditLists, and so there is the advantageous result that when reconfiguring the original long-duration clip, EditList-n alone may need to be processed, and implementation is further simplified.

Further, EditLists, which are information enabling referencing of the contextual relations of clips, are written together with each divided clip as clip reproduction procedure information. Accordingly, at the time of reproduction, when reproduction of one divided clip ends, continuous reproduction of the next divided clip is possible. Moreover, if files are recorded on media for which random access is possible, then digest reproduction of only the required portions, such as reproduction in which reproduced scenes are connected in five-second or ten-second units, is also possible. The order of reproduction of divided clips can also be rearranged according to user preferences.

Further, according to the embodiment of the present invention, a plurality of clips, files or similar divided and recorded onto media can easily be edited. In this regard, editing can be performed by an image capture apparatus provided with editing functions or by a server on which data transmitted from an image capture apparatus is stored. Further, by using EditLists, there is the advantageous result that the contextual relations of a plurality of divided files can be recognized. Moreover, there is the advantageous result that even when a long-duration clip is divided into a plurality of divided files, the divided files can be logically connected and can be easily recognized as a single long-duration clip.

Further, even when a long-duration clip is recorded onto a plurality of media, with a plurality of semiconductor memory devices being inserted into semiconductor memory interfaces, writing is continued to the next semiconductor memory device after the storage capacity of one semiconductor memory device becomes full. In the middle of recording, an EditList (intermediate EditList) is written to a semiconductor memory, so that the position of the recording clip in the entire original clip can be confirmed, which is the advantageous result.

A UMID specified by an EditList may be converted into an individual URL. With such conversion, there is the advantageous result that wherever a user may be, data can be acquired and viewed via the Internet, so that convenience of use is improved. Further, even in the case of streamed distribution of data, by appending EditLists to a plurality of divided clips, there is the advantageous result that the received divided clips can easily be used to reconstruct the original long-duration clip.

Further, according to the above-described embodiment, PCI Express standard or USB (Universal Serial Bus) standard can be used as semiconductor memory interfaces, but not limited thereto. Further, a plurality of semiconductor memory interfaces are provided and if the storage capacity of one semiconductor memory device becomes full, the device is replaced with another semiconductor memory device and data writing is continued. However, a single semiconductor interface may be provided. In this case, by securing a large amount of internal memory in the image capture apparatus, EditLists can be prepared similarly to the above-described embodiment, and recording to and editing of a plurality of clips can be performed. Further, by connecting the image capture apparatus to a high-speed network circuit, recorded data may be transmitted over the network circuit to a server or to a computer apparatus.

Further, the image capture apparatus according to the above-described embodiment uses a plurality of removable recording media to perform recording and reproduction of video and audio. However, similar functions and advantageous results can be obtained when used in other applications (for example, monitoring cameras). Further, the image capture apparatus according to the above-described embodiment uses semiconductor memory devices as recording media; but optical discs, magnetic disks, or other recording media may be used to record data. Alternatively, recorded data may be continuously transmitted to a server or similar over a network.

It should be understood by those skilled in the art that various modifications, combinations, sub-combinations and alterations may occur depending on design requirements and other factors insofar as they are within the scope of the appended claims or equivalents thereof.

What is claimed is:

1. A recording apparatus which divides a material including video and/or audio information and records divided materials onto a plurality of recording media, the recording apparatus comprising:
    a control unit configured to divide the material into a plurality of divided materials having a particular order and to prepare, for each one of the divided materials, corresponding reproduction procedure information by which the plurality of divided materials is reproducible in the particular order, the corresponding reproduction procedure information for each one of the divided materials including recording information for that divided material;
    an interface configured to attach the plurality of recording media; and
    a recording device configured to record the divided materials and the corresponding reproduction procedure information including recording information for the divided materials onto separate recording media for each one of the respective divided materials,
    wherein the corresponding reproduction procedure information recorded on each one of the recording media combines to represent the particular order of the entire material, and
    the corresponding reproduction procedure information recorded on a given one of the recording media in the particular order includes the corresponding reproduction procedure information recorded on each one of the recording media that precede the given one of the recording media in the particular order.

2. A recording apparatus according to claim 1, wherein the reproduction procedure information includes a name specifying a divided material reproduced prior to another divided material corresponding to the reproduction procedure information, and a name specifying the divided material corresponding to the reproduction procedure information.

3. A recording apparatus according to claim 2, wherein the reproduction procedure information further includes a name specifying a divided material reproduced after the divided material corresponding to the reproduction procedure information.

4. A recording apparatus according to claim 2, wherein the reproduction procedure information includes time information representing a start of reproduction and time information representing an end of reproduction for each divided material.

5. A recording apparatus according to claim 2, wherein the reproduction procedure information includes a frame number representing a start of reproduction and a frame number representing an end of reproduction for each divided material.

6. A recording apparatus according to claim 1, wherein the reproduction procedure information is information common to the whole of the plurality of divided materials.

7. A recording apparatus according to claim 1, wherein the reproduction procedure information is an XML document.

8. A recording apparatus according to claim 1, wherein PCI express standard interface is used as the interface.

9. A method of recording a material including video and/or audio information onto a plurality of recording media after dividing the material into divided materials, the method comprising:
    dividing the material into a plurality of divided materials having a particular order;
    preparing, for each of the divided materials, corresponding reproduction procedure information by which the plurality of divided materials is reproducible in the particular order, the corresponding reproduction procedure information for each one of the divided materials including recording information for that divided material; and
    recording the divided materials and the corresponding reproduction procedure information including recording information for the divided materials onto separate recording media for each one of the respective divided materials,
    wherein the corresponding reproduction procedure information recorded on each one of the recording media combines to represent the particular order of the entire material, and
    the corresponding reproduction procedure information recorded on a given one of the recording media in the particular order includes the corresponding reproduction procedure information recorded on each one of the recording media that precede the given one of the recording media in the particular order.

10. A reproduction apparatus which reproduces a material including video and/or audio information from a plurality of recording media in which are recorded divided materials obtained by dividing the material in a particular order and corresponding reproduction procedure information by which the plurality of divided materials is reproducible in the particular order, the corresponding reproduction procedure information for each one of the divided materials including recording information for that divided material, the reproduction apparatus comprising:
    a reproduction control unit configured to reference final recorded reproduction procedure information read from a server remote to the reproduction apparatus and to control the order of reproduction of the divided materials recorded on the plurality of recording media,
    wherein the corresponding reproduction procedure information recorded on each one of the recording media combines to represent the particular order of the entire material, and
    the corresponding reproduction procedure information recorded on a given one of the recording media in the particular order includes the corresponding reproduction procedure information recorded on each one of the recording media that precede the given one of the recording media in the particular order.

11. A method of reproducing a material including video and/or audio information from a plurality of recording media in which are recorded divided materials obtained by dividing the material in a particular order and corresponding reproduction procedure information by which the plurality of divided materials is reproducible in the particular order, the corresponding reproduction procedure information for each one of the divided materials including recording information for that divided material, the method comprising:
    referencing final recorded reproduction procedure information read from a server remote to a reproduction apparatus and controlling the order of reproduction of the divided materials recorded on the recording media, wherein the corresponding reproduction procedure information recorded on each one of the recording media combines to represent the particular order of the entire material, and the corresponding reproduction procedure information recorded on a given one of the recording media in the particular order includes the corresponding reproduction procedure information recorded on each one of the recording media that precede the given one of the recording media in the particular order.

12. A recording and reproduction apparatus which divides a material including video and/or audio information and records divided materials onto a plurality of recording media and which reproduces recorded materials, the recording and reproduction apparatus comprising:

a control unit configured to divide the material into a plurality of divided materials having a particular order and to prepare, for each one of the divided materials, corresponding reproduction procedure information by which the plurality of divided materials is reproducible in the particular order, the corresponding reproduction procedure information for each one of the divided materials including recording information for that divided material;

an interface configured to attach the plurality of recording media;

a recording device configured to record the divided materials and the corresponding reproduction procedure information including recording information for the divided materials onto separate recording media for each one of the respective divided materials; and a reproduction control unit configured to reference final recorded reproduction procedure information read from a server remote to the recording and reproduction apparatus and to control the order of reproduction of the divided materials recorded on the plurality of recording media, wherein the corresponding reproduction procedure information recorded on each one of the recording media combines to represent the particular order of the entire material, and the corresponding reproduction procedure information recorded on a given one of the recording media in the particular order includes the corresponding reproduction procedure information recorded on each one of the recording media that precede the given one of the recording media in the particular order.

13. A method of recording a material including video and/or audio information onto a plurality of recording media after dividing the material into divided materials and reproducing the recorded material, the method comprising:

dividing the material into a plurality of divided materials having a particular order;

preparing, for each of the divided materials, corresponding reproduction procedure information by which the plurality of divided materials is reproducible in the particular order, the corresponding reproduction procedure information for each one of the divided materials including recording information for that divided material;

recording the divided materials and the corresponding reproduction procedure information including recording information for the divided materials onto separate recording media for each one of the respective divided materials; and referencing final recorded reproduction procedure information read from a server remote and controlling the order of reproduction of the divided materials recorded on the recording media, wherein the corresponding reproduction procedure information recorded on each one of the recording media combines to represent the particular order of the entire material, and the corresponding reproduction procedure information recorded on a given one of the recording media in the particular order includes the corresponding reproduction procedure information recorded on each one of the recording media that precede the given one of the recording media in the particular order.

14. An image capturing and recording apparatus, comprising:

an image capture device configured to capture images of objects and convert captured images into image signals;

a control unit configured to divide a material including the image signals captured by the image capture device into a plurality of divided materials having a particular order and to prepare, for each one of the divided materials, corresponding reproduction procedure information by which the plurality of divided materials is reproducible in the particular order, the corresponding reproduction procedure information for each one of the divided materials including recording information for that divided material;

an interface configured to attach a plurality of recording media; and a recording device configured to record the divided materials and the corresponding reproduction procedure information including recording information for the divided materials onto separate recording media for each one of the respective divided materials, wherein the corresponding reproduction procedure information recorded on each one of the recording media combines to represent the particular order of the entire material, and the corresponding reproduction procedure information recorded on a given one of the recording media in the particular order includes the corresponding reproduction procedure information recorded on each one of the recording media that precede the given one of the recording media in the particular order.

15. A method of capturing and recording images, the method comprising:

capturing images of objects to obtain image signals;

dividing a material including the image signals captured at the capturing step into a plurality of divided materials having a particular order;

preparing, for each of the divided materials, corresponding reproduction procedure information by which the plurality of divided materials is reproducible in the particular order, the corresponding reproduction procedure information for each one of the divided materials including recording information for that divided material; and recording the divided materials and the corresponding reproduction procedure information including recording information for the divided materials onto separate recording media for each one of the respective divided materials, wherein the corresponding reproduction procedure information recorded on each one of the recording media combines to represent the particular order of the entire material, and the corresponding reproduction procedure information recorded on a given one of the recording media in the particular order includes the corresponding reproduction procedure information recorded on each one of the recording media that precede the given one of the recording media in the particular order.

16. Non-transitory recording media to which divided materials obtained from a material including video and/or audio information and reproduction procedure information including recording information for the divided materials are recorded, wherein the divided materials and the reproduction procedure information are recorded using a recording apparatus, including:

a control unit configured to divide the material including video and/or audio information into a plurality of divided materials having a particular order and to prepare, for each one of the divided materials, corresponding reproduction procedure information by which the plurality of divided materials is reproducible in the particular order, the corresponding reproduction procedure information for each one of the divided materials including recording information for that divided material, an interface configured to attach the plurality of recording media, and a recording device configured to record the divided materials and the corresponding reproduction procedure information including recording information for the divided materials onto separate recording media for each one of the respective divided materials, wherein the corresponding reproduction procedure information recorded on each one of the recording media combines to represent the particular order of the entire material, and the corresponding reproduction procedure information recorded on a given one of the recording media in the particular order includes the corresponding reproduction procedure information recorded on each one of the recording media that precede the given one of the recording media in the particular order.

* * * * *